United States Patent
Sawdon et al.

[11] Patent Number: 5,853,211
[45] Date of Patent: Dec. 29, 1998

[54] UNIVERSAL GRIPPER

[75] Inventors: Edwin G. Sawdon, St. Clair; Dean J. Kruger, Jeddo; Steven J. Sprotberry, Marysville, all of Mich.

[73] Assignee: BTM Corporation, Marysville, Mich.

[21] Appl. No.: 781,638

[22] Filed: Jan. 10, 1997

[51] Int. Cl.$^6$ .................................................. B25J 15/04
[52] U.S. Cl. ............................................ 294/116; 294/88
[58] Field of Search ........................... 294/88, 104, 106, 294/115, 116, 118; 269/32, 34, 229, 231, 233, 237; 901/37

[56] References Cited

U.S. PATENT DOCUMENTS

| | | |
|---|---|---|
| 667,350 | 2/1901 | Ulrich et al. . |
| 1,412,961 | 4/1922 | Periolat . |
| 2,165,322 | 7/1939 | Weston . |
| 3,013,835 | 12/1961 | Blatt . |
| 3,184,259 | 5/1965 | Almdale . |
| 3,197,894 | 8/1965 | Ratkowski . |
| 3,381,954 | 5/1968 | Blatt . |
| 3,403,901 | 10/1968 | Servadio . |
| 3,482,830 | 12/1969 | Sendoykas . |
| 3,570,835 | 3/1971 | McPherson . |
| 3,599,957 | 8/1971 | Blatt . |
| 3,618,931 | 11/1971 | Blatt . |
| 3,630,391 | 12/1971 | Wilson ..................................... 294/116 |
| 3,635,514 | 1/1972 | Blatt . |
| 3,655,233 | 4/1972 | Twist . |
| 3,768,401 | 10/1973 | Sahm et al. . |
| 3,848,753 | 11/1974 | Borg et al. . |
| 4,109,953 | 8/1978 | Seymour . |
| 4,234,223 | 11/1980 | O'Neil ........................................ 294/88 |
| 4,244,618 | 1/1981 | Boyer et al. . |
| 4,381,169 | 4/1983 | Muhr et al. .............................. 294/116 |
| 4,445,676 | 5/1984 | Tiinkers . |
| 4,452,556 | 6/1984 | Nelson et al. . |
| 4,473,249 | 9/1984 | Valentine et al. .......................... 294/88 |
| 4,496,138 | 1/1985 | Blatt . |
| 4,616,536 | 10/1986 | Knebel et al. . |
| 4,620,696 | 11/1986 | Blatt . |
| 4,650,237 | 3/1987 | Lessway ................................... 294/88 |
| 4,723,767 | 2/1988 | McPherson et al. . |

(List continued on next page.)

FOREIGN PATENT DOCUMENTS

| | | |
|---|---|---|
| 0163219A1 | 12/1985 | European Pat. Off. . |
| 0435079A2 | 7/1991 | European Pat. Off. . |
| 0 577 569 A1 | 1/1994 | European Pat. Off. . |
| 377960 | 9/1907 | France . |
| 2223177 | 10/1974 | France . |
| 2019011 | 7/1971 | Germany . |
| 3613582C1 | 10/1987 | Germany . |
| 1342860 | 10/1987 | U.S.S.R. . |
| 932218 | 7/1963 | United Kingdom . |
| 2191428 | 12/1987 | United Kingdom . |

OTHER PUBLICATIONS

1500 Series Power Grippers and Accessories, BTM Corporation, 4 pages (prior to Jan. 1997).

1500 Series Omni–Head Power Clamps, BTM Corporation, pp. 1–7 (prior to Jan. 1997).

A New Breed of Power, BTM Corporation, Entire publication (prior to Jan. 1997).

A New Breed of Power: Specifically Engineered for Close Stacking Simplified Automation and Reduced Productions Costs, BTM Corporation, Entire publication (prior to Jan. 1997).

(List continued on next page.)

*Primary Examiner*—Dean Kramer
*Attorney, Agent, or Firm*—Harness, Dickey & Pierce, P.L.C.

[57] ABSTRACT

A universal gripper has a movable arm locked in a gripping position by abutting against a movable blocking member. A pair of pivoting arms are maintained in their gripping positions by a blocking member being linearly slid between ends of the arms. Varying movable arm configurations can be easily interchanged with each other and mounted to a body by way of a single fixed pivot pin. The opening angle of a gripper arm can be mechanically limited to various positions by selective positioning of an adjustment member.

33 Claims, 25 Drawing Sheets

5,853,211
Page 2

U.S. PATENT DOCUMENTS

| | | |
|---|---|---|
| 4,759,225 | 7/1988 | Reynertson et al. . |
| 4,765,669 | 8/1988 | Meier . |
| 4,838,532 | 6/1989 | Horn et al. . |
| 4,905,973 | 3/1990 | Blatt . |
| 5,040,278 | 8/1991 | Eckold et al. . |
| 5,064,177 | 11/1991 | Witt et al. . |
| 5,072,652 | 12/1991 | Blatt . |
| 5,085,480 | 2/1992 | Jackson ................................. 294/116 |
| 5,125,632 | 6/1992 | Blatt et al. . |
| 5,129,388 | 7/1992 | Vignaid et al. . |
| 5,152,568 | 10/1992 | Blatt . |
| 5,193,789 | 3/1993 | Tucker . |
| 5,215,295 | 6/1993 | Hoover . |
| 5,266,057 | 11/1993 | Angel, Jr. et al. . |
| 5,299,847 | 4/1994 | Blatt et al. . |
| 5,503,378 | 4/1996 | Schauss et al. . |
| 5,516,173 | 5/1996 | Sawdon . |
| 5,671,961 | 9/1997 | Buck ...................................... 294/116 |

OTHER PUBLICATIONS

DE–STA–CO Brochure, 4 pages, Sep., 1993.

Grippers for High Speed Part Transfer in Press, BTM Corporation, pp. 1–15 (prior to Jan. 1997).

Optional AC & DC Electrical Proximity Switches for BTM Power Clamps, BTM Corporation, 2 pages (prior to Jan. 1997).

PHD Series 190 & 191 Parallel Grippers, pp. 1–16, 1995.

PHD Solutions for Factory Automation Grippers, pp. 6–1 to 6–77, 1993.

PHD Series GRD Parallel Grippers, pp. 1–16, 1996.

PHD Series GRC Parallel Grippers, pp. 1–20, 1996.

Power Clamp 1500 Series, BTM Corporation, 10 pages (prior to Jan. 1997).

Power Clamps & Grippers, BTM Corporation, pp. 1–23 (prior to Jan. 1997).

Product Brochure entitled "Robotics Gripper and Vacuum Heads", Form No. GVH 887 I.S.I. Manufacturing, Inc. (prior to Jan. 1997).

Sealed Power Clamps, BTM Corporation, pp. 1–10 (prior to Jan. 1997).

Sealed Toggle Clamps, BTM Corporation, 4 pages (prior to Jan. 1997).

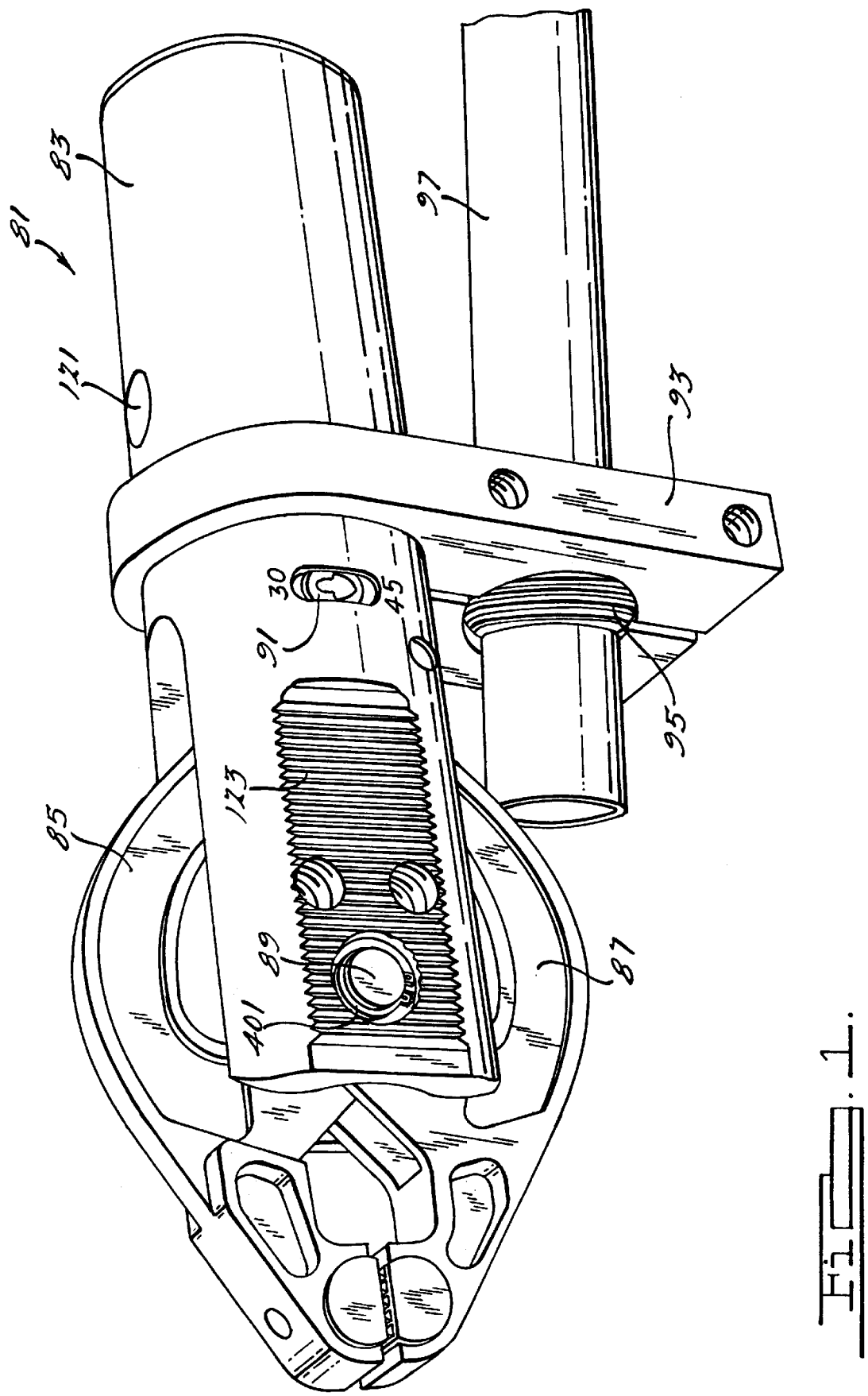

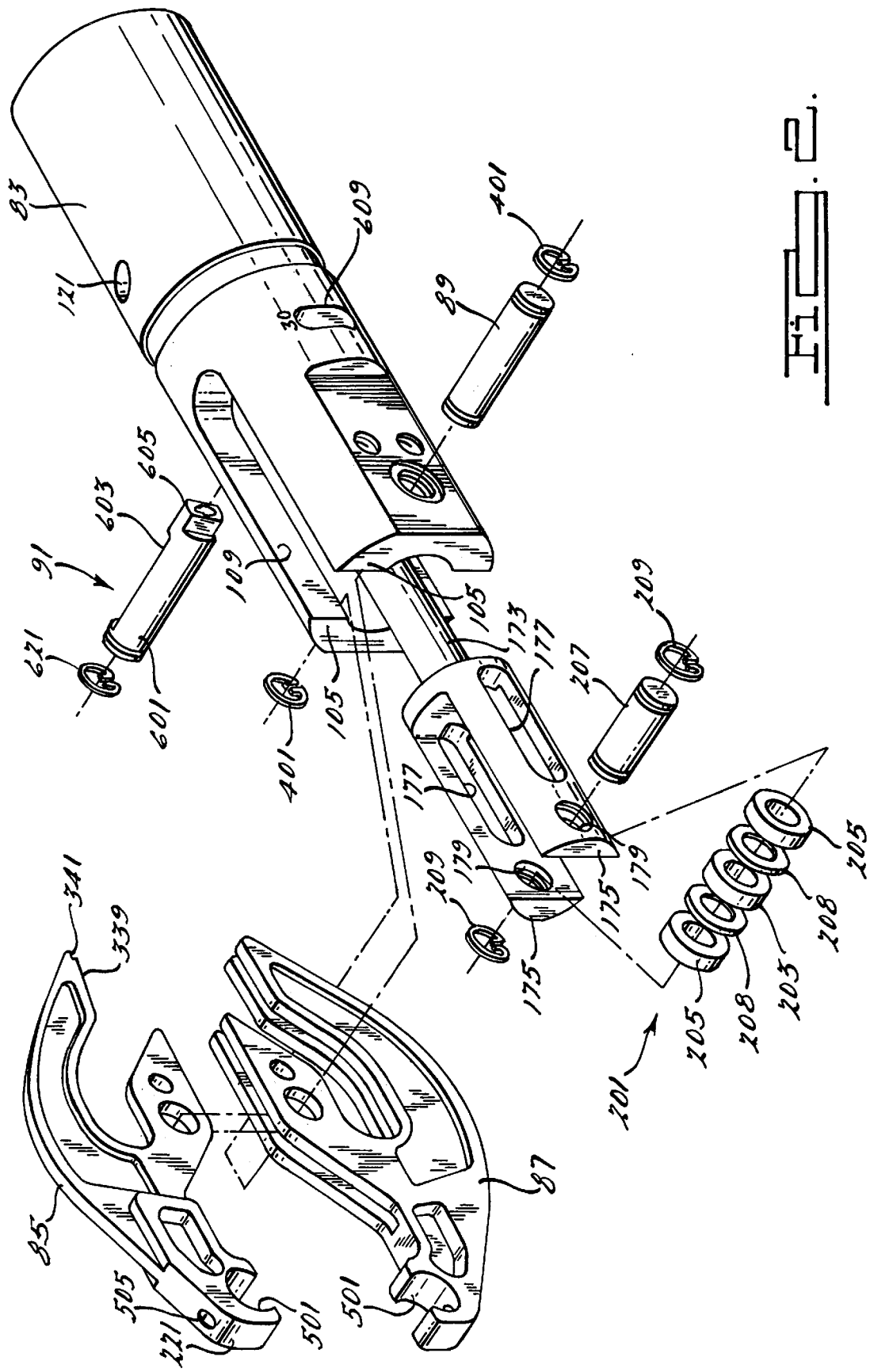

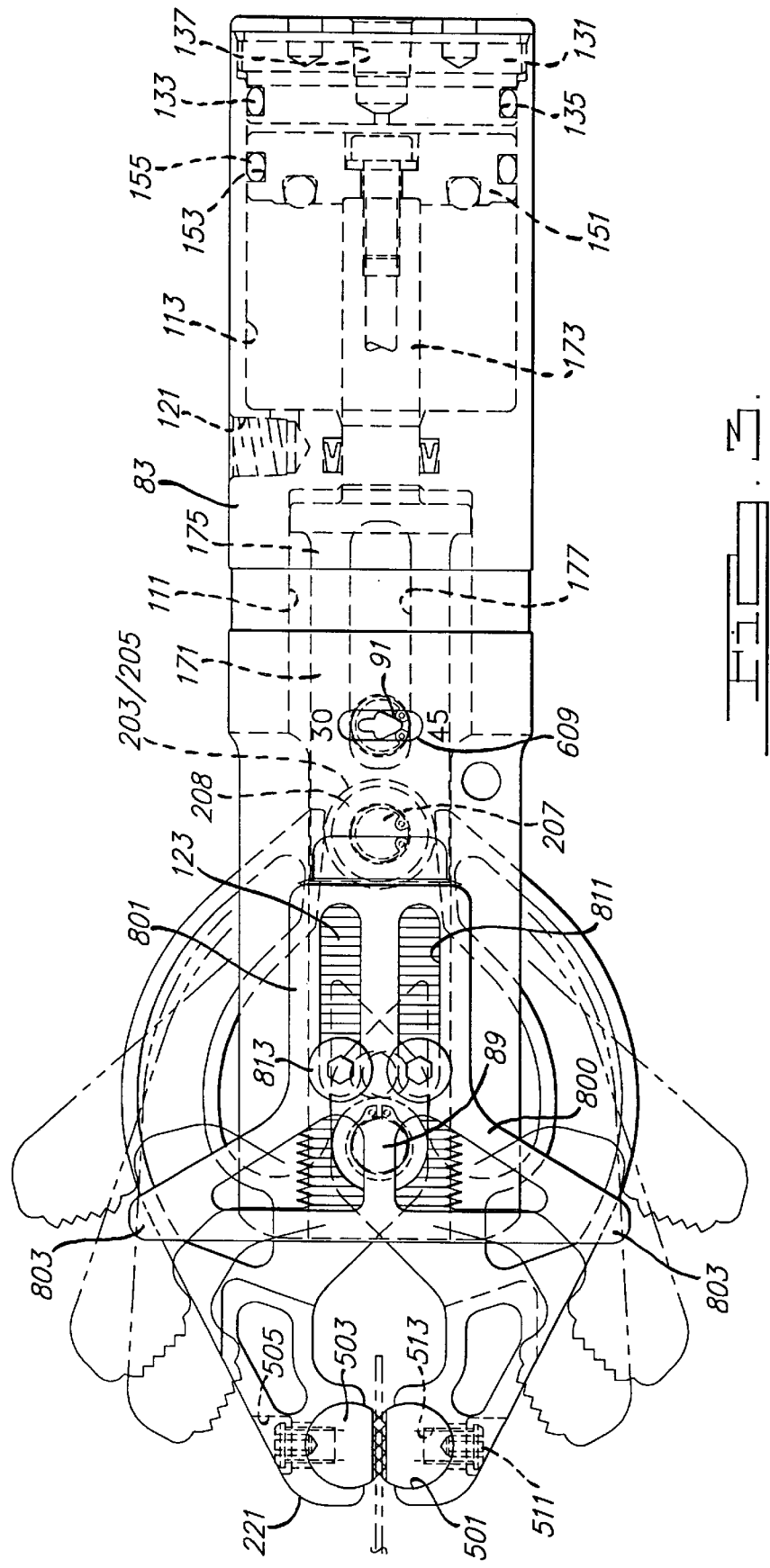

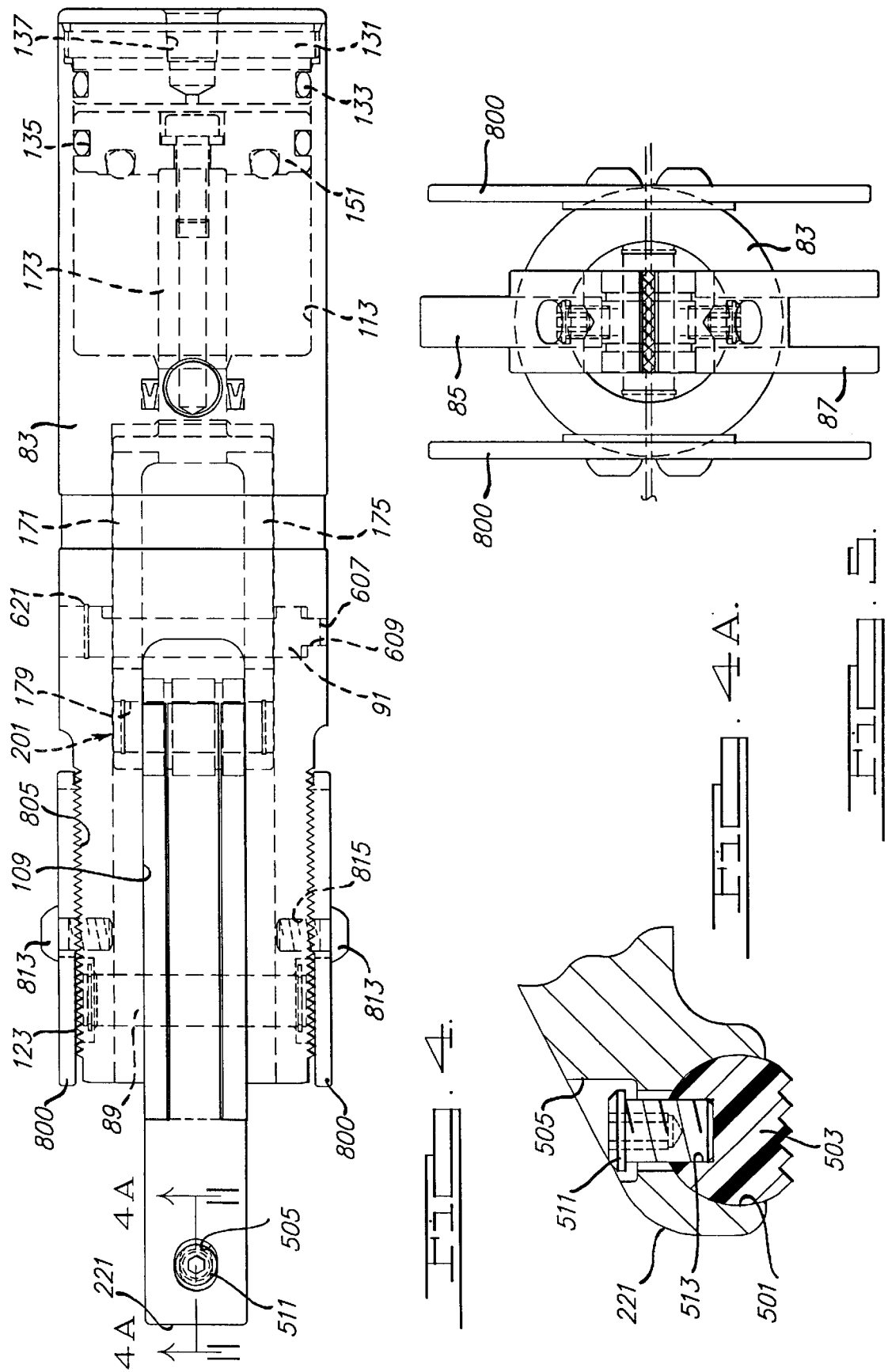

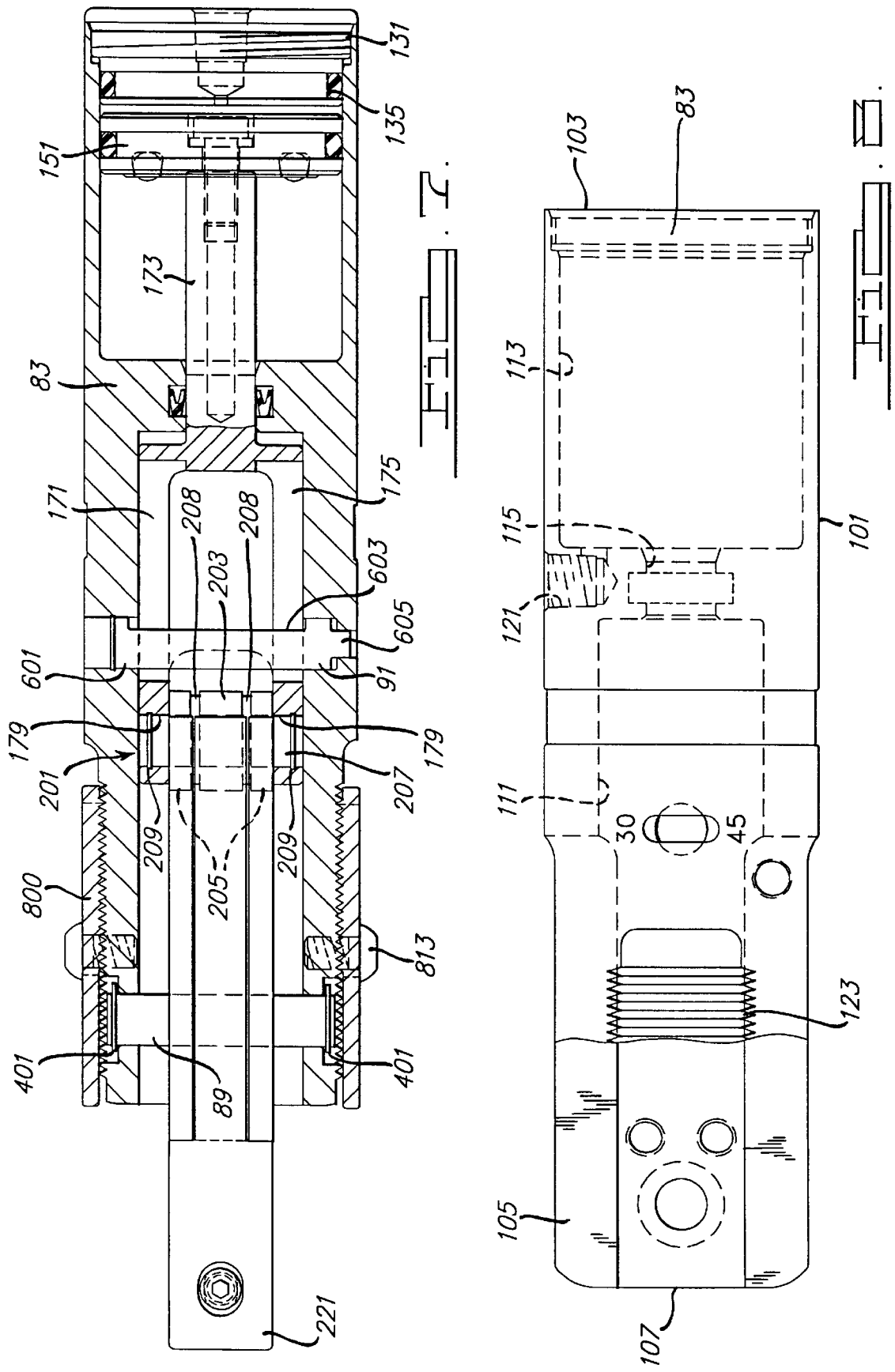

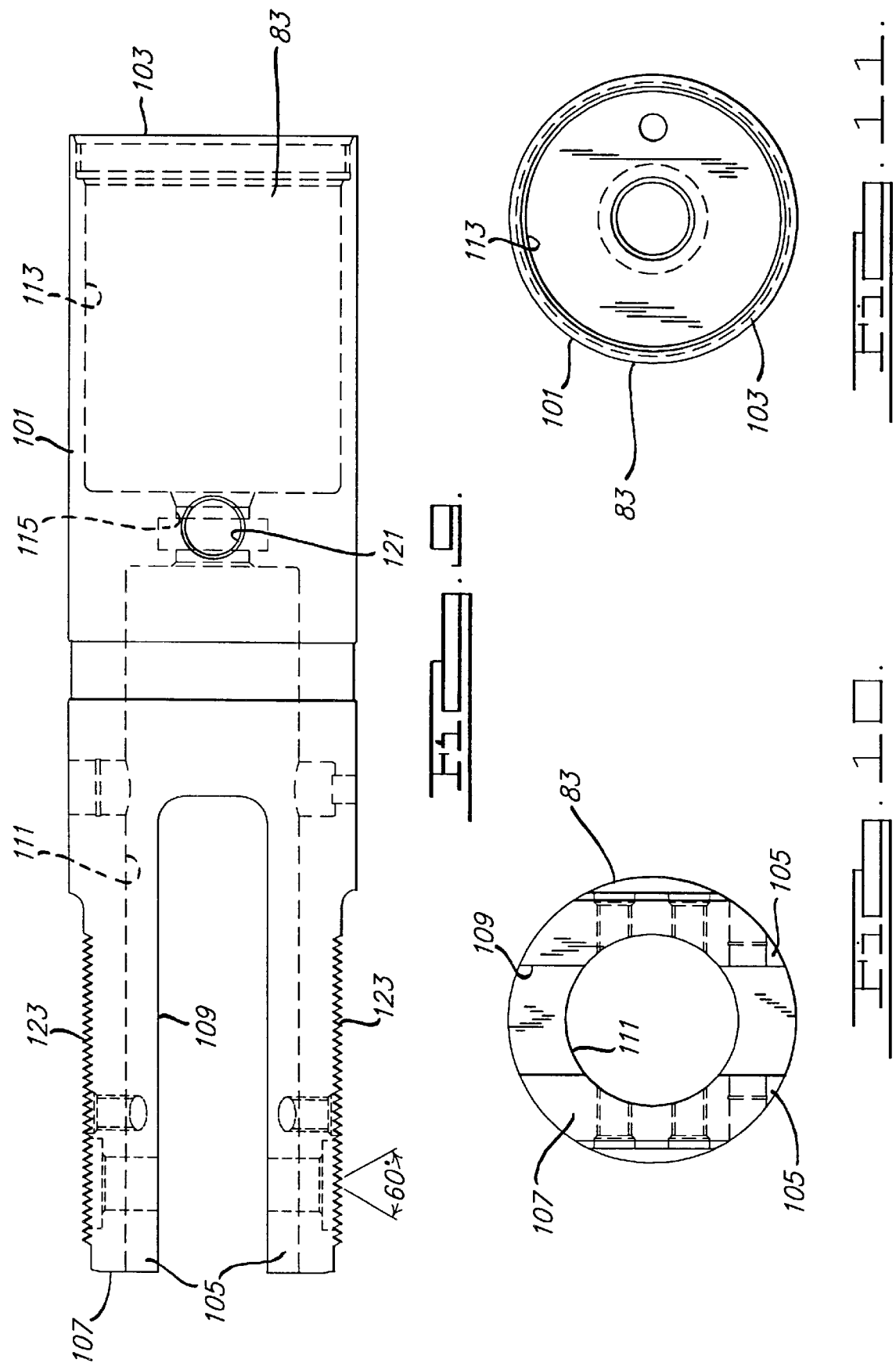

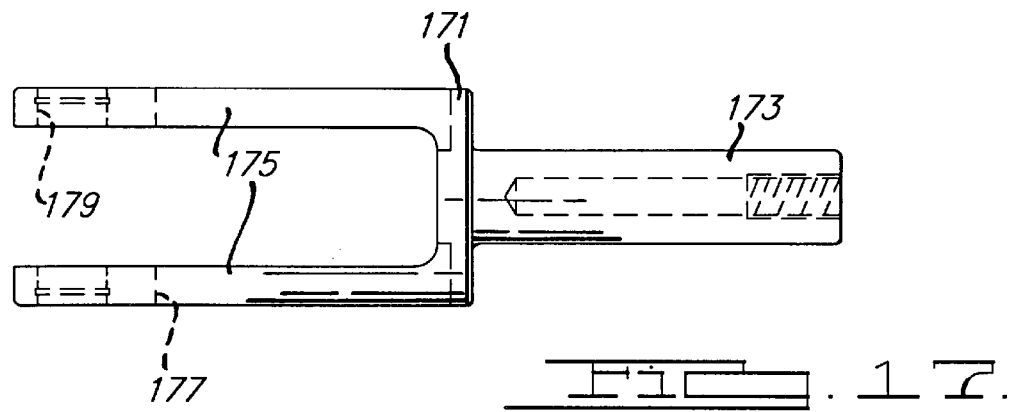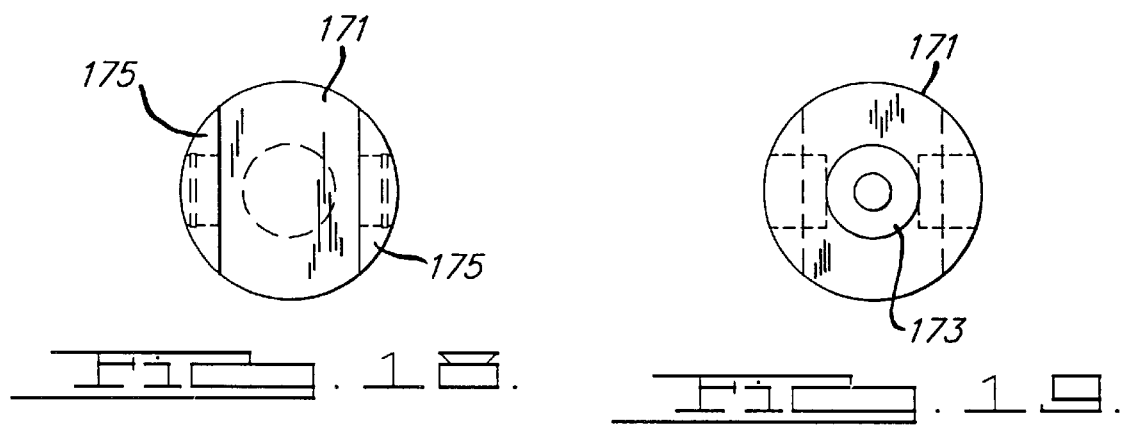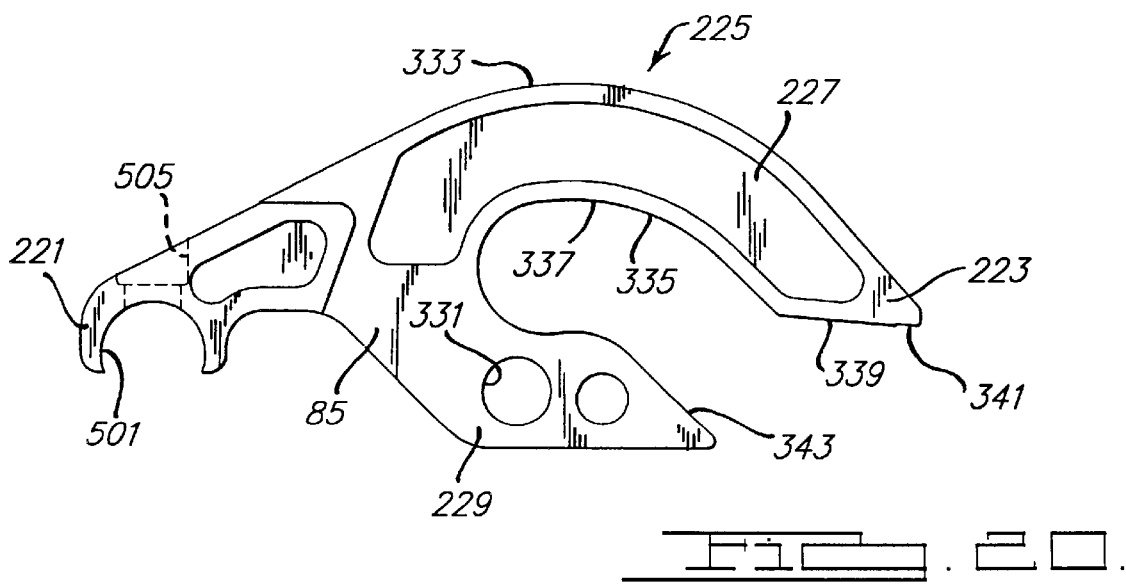

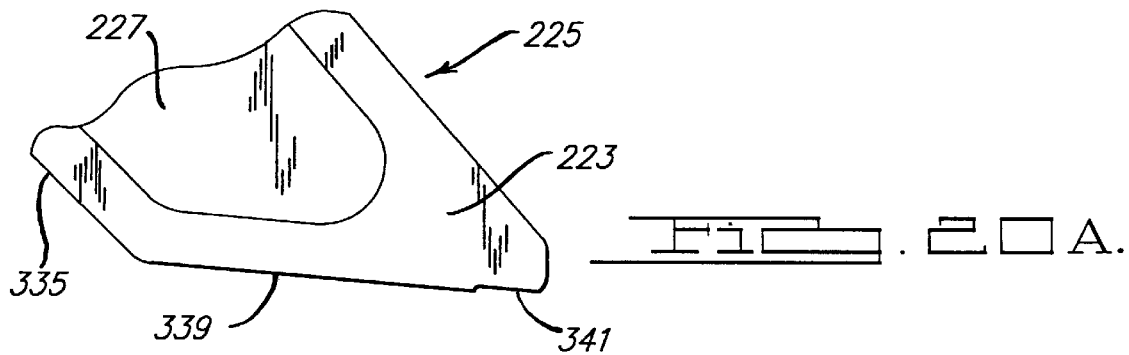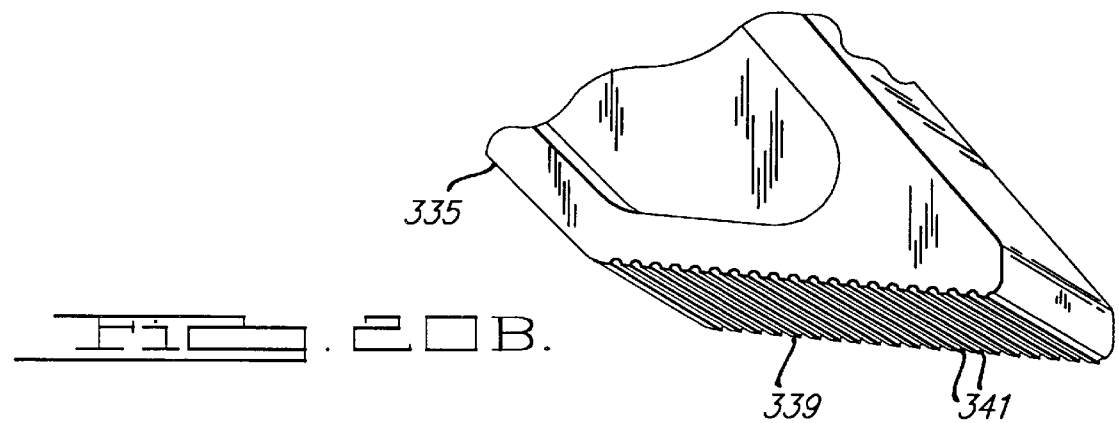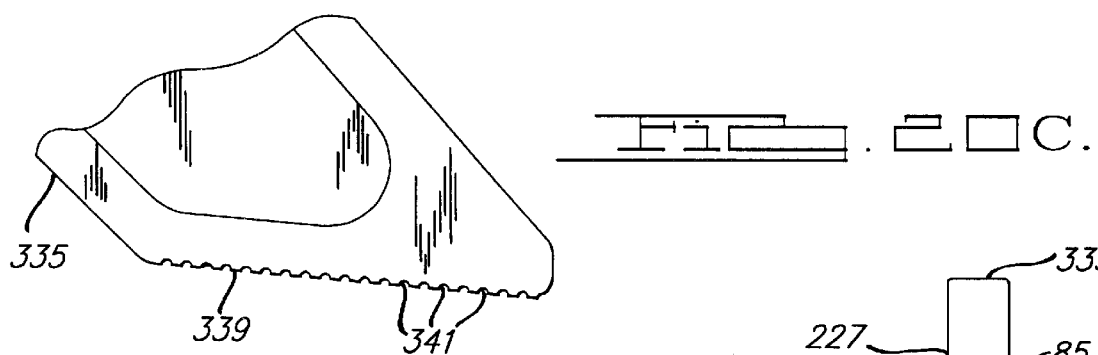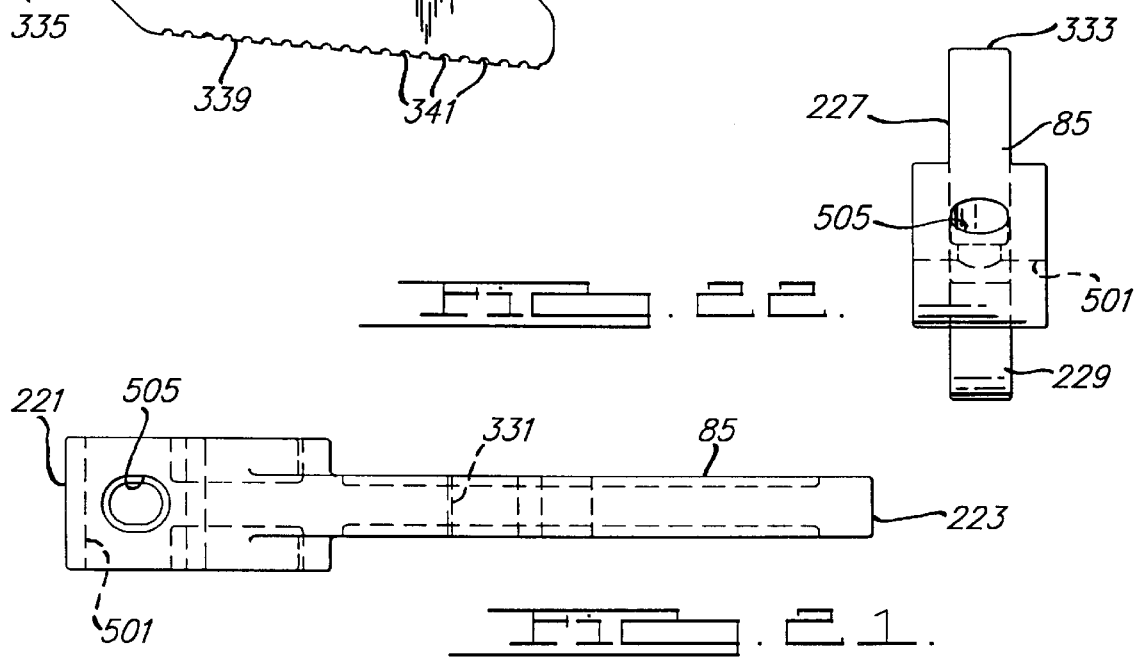

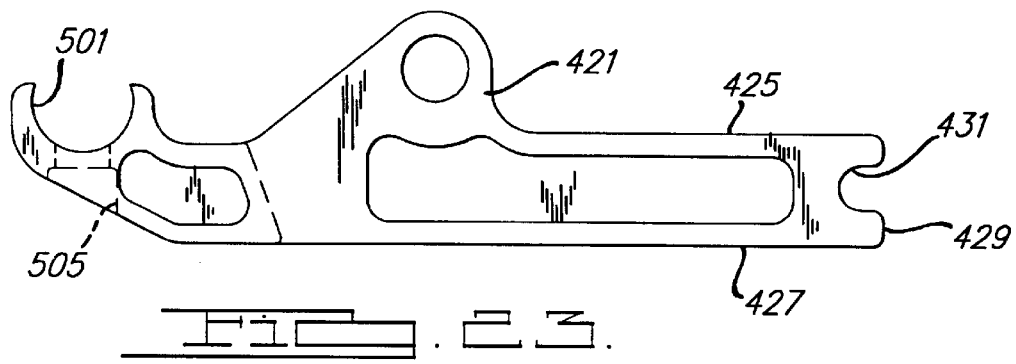
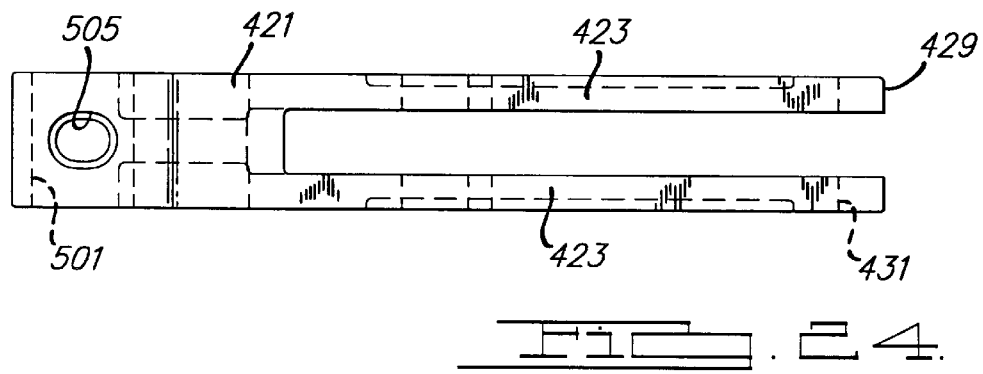
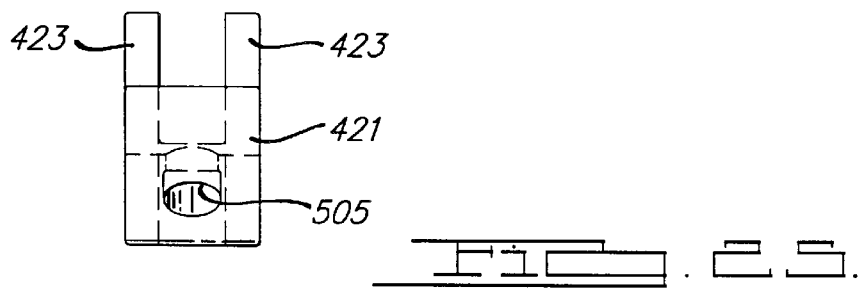
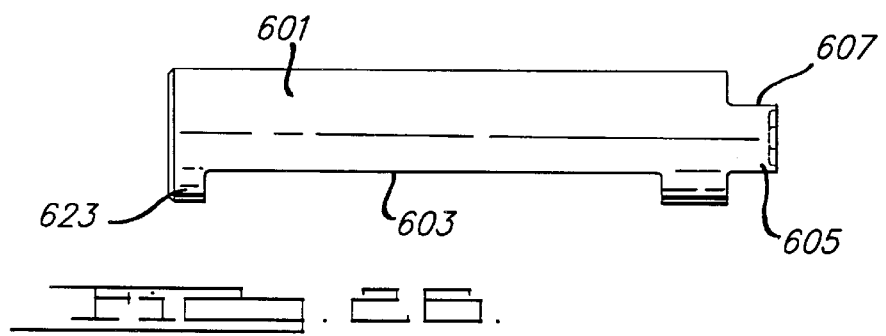
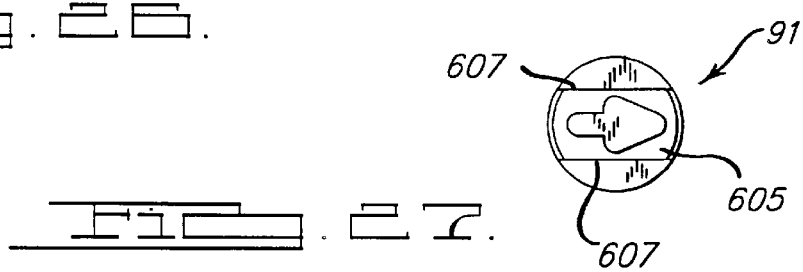

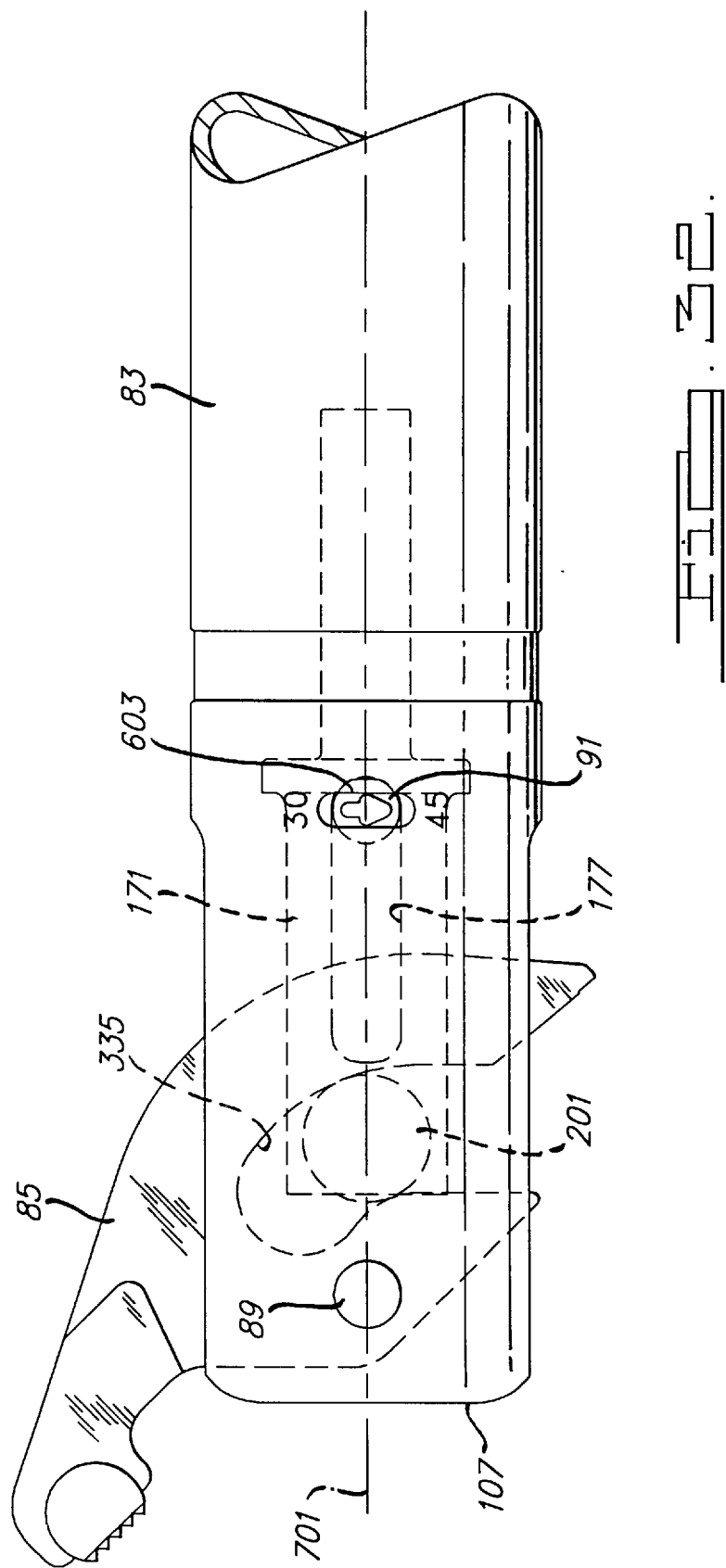

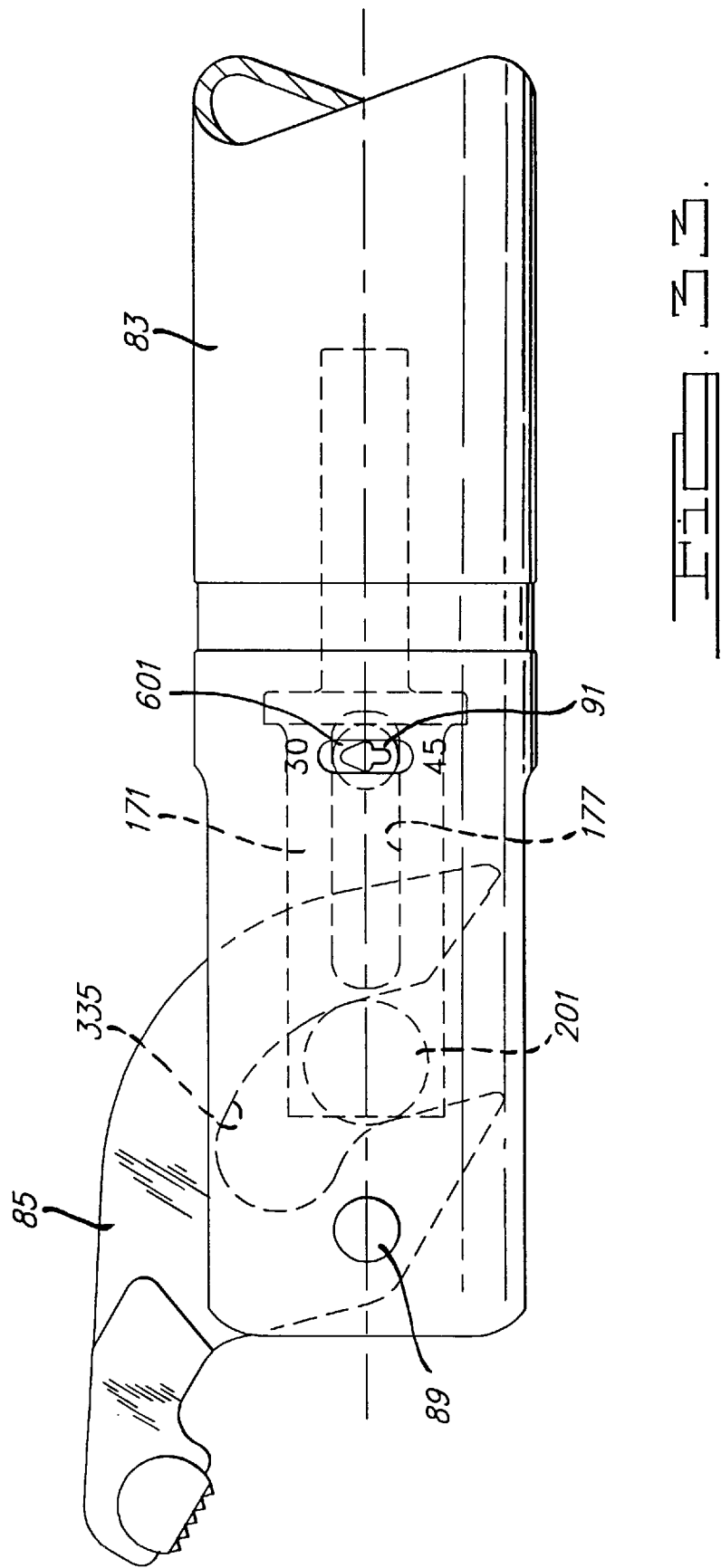

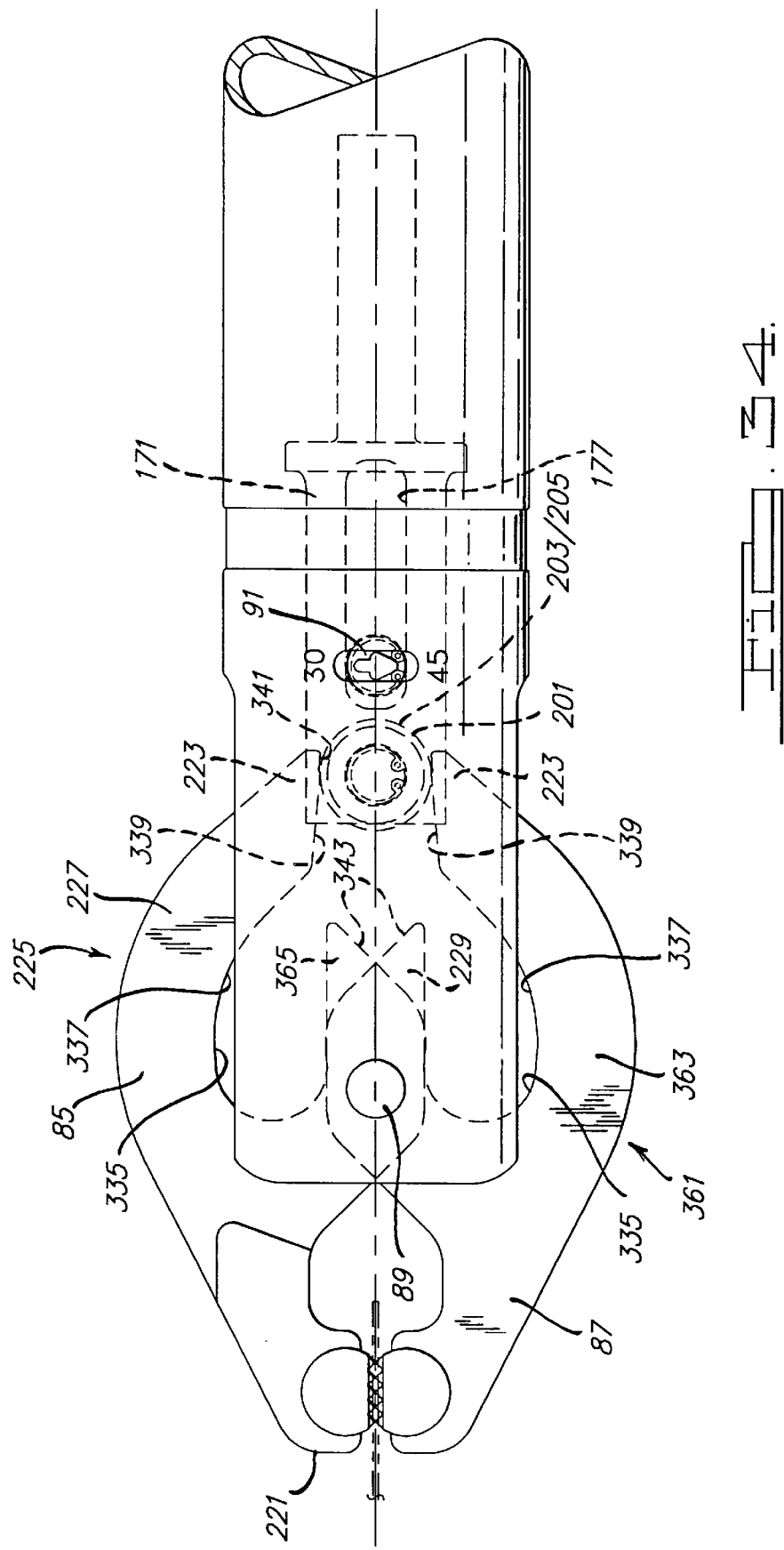

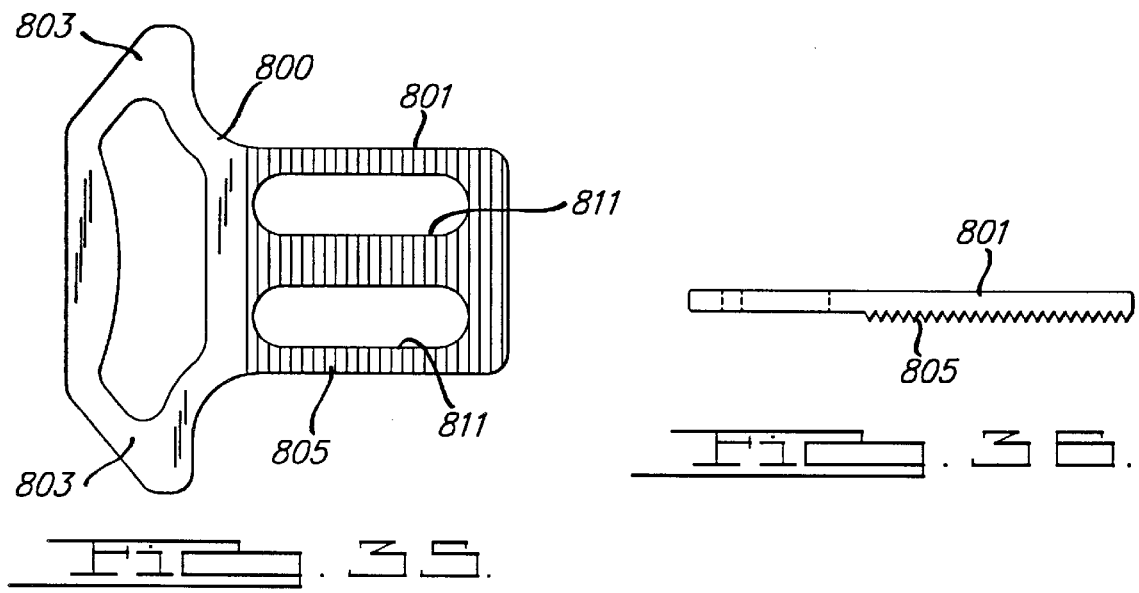
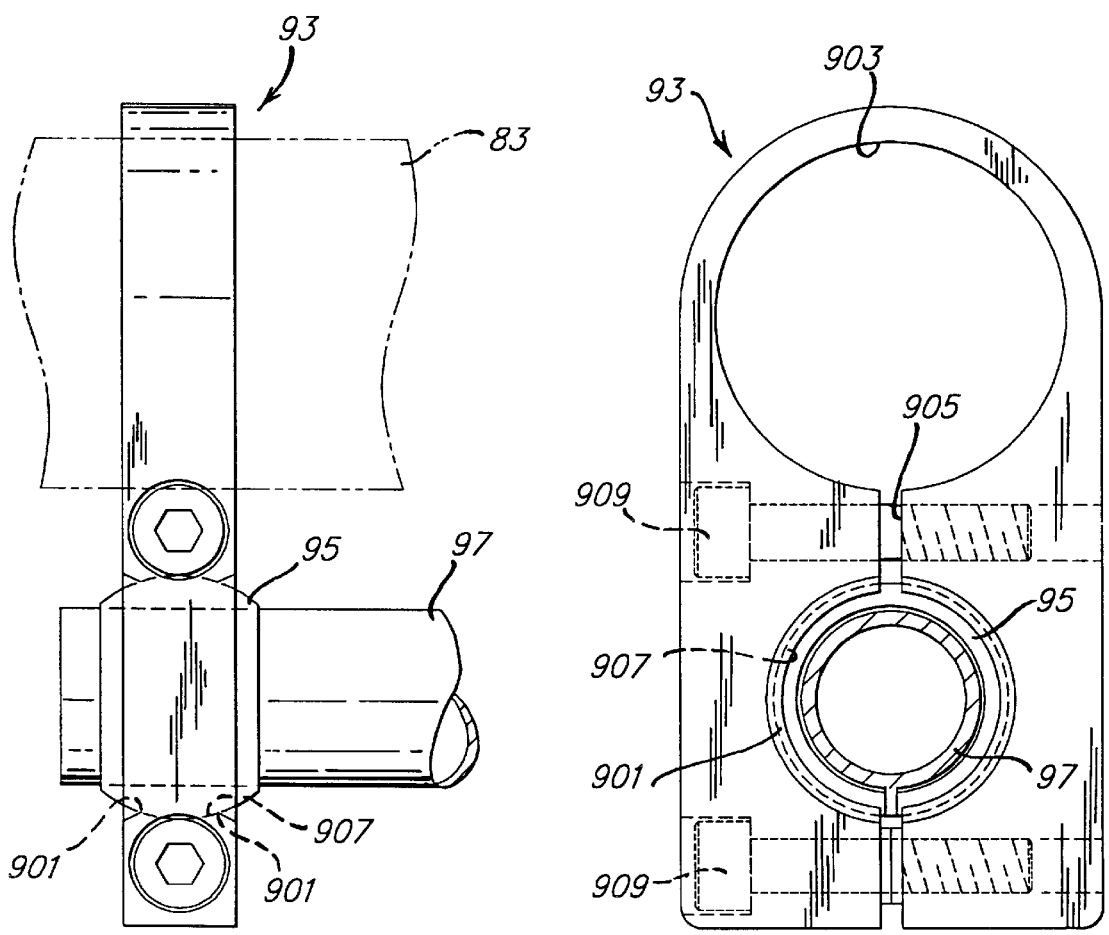

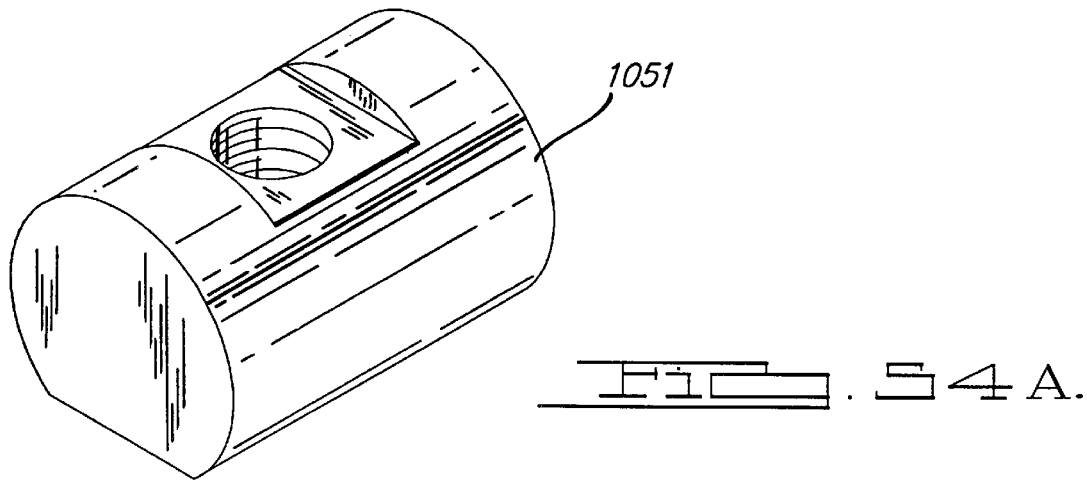
FIG. 54A.
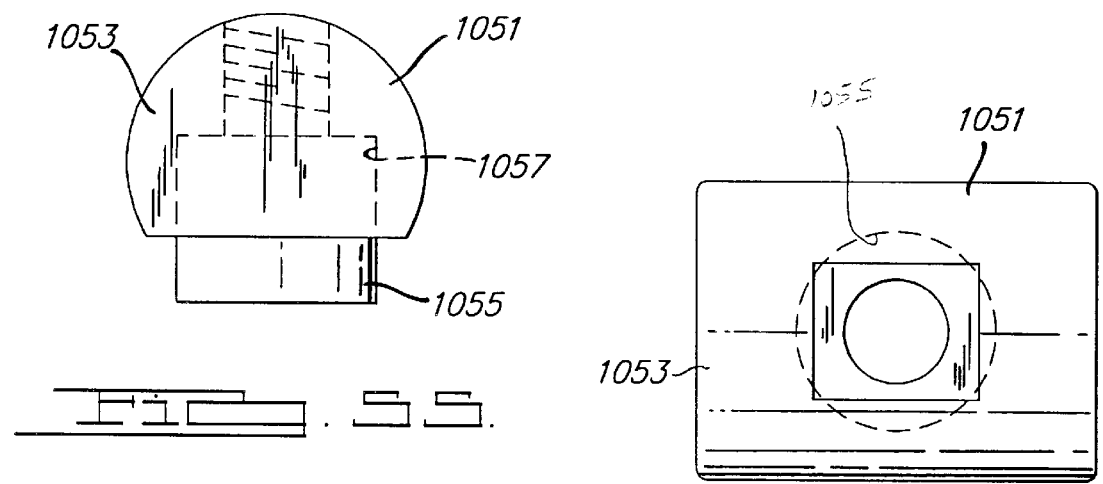
FIG. 55.
FIG. 56.
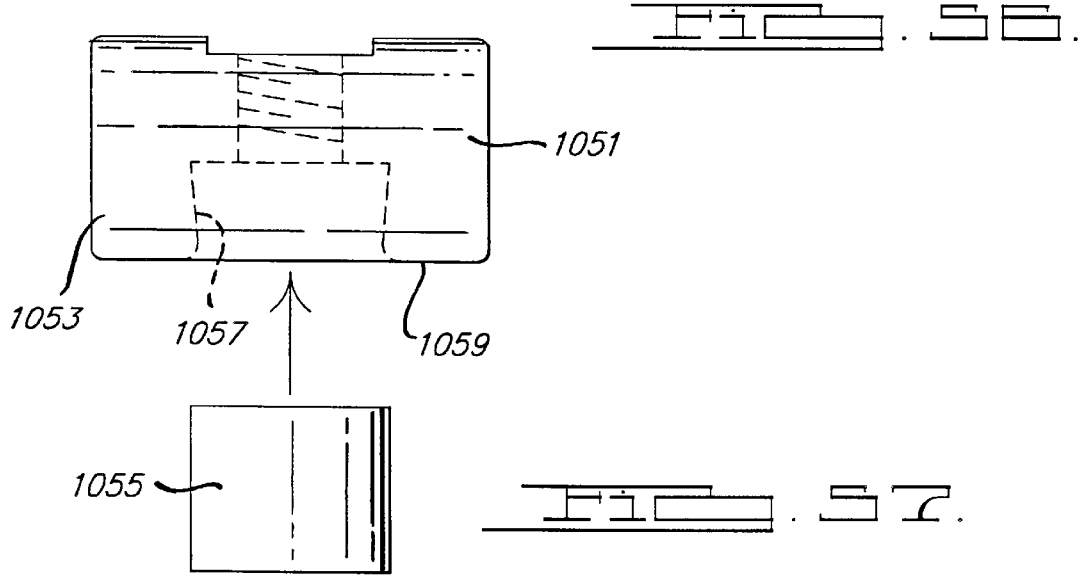
FIG. 57.

UNIVERSAL GRIPPER

BACKGROUND AND SUMMARY OF THE INVENTION

This invention relates generally to grippers and specifically to a powered gripper having a moving arm and a blocking member.

Automated or powered grippers have been commonly used to grip or retain work pieces, such as sheet metal, polymeric parts and the like in checking fixtures, gauging stations, welding stations and punching machines. Such grippers have also been used to transfer work pieces between stations when mounted to a robotic arm.

Many existing grippers are powered by hydraulic or pneumatic fluid devices. Furthermore, known grippers often employ one or more moving arms which move in response to piston-type actuation. Examples of such grippers are disclosed in U.S. Pat. No. 5,516,173 entitled "Gripper" which issued to Sawdon on May 14, 1996 (the disclosure of which is hereby incorporated herein by reference); as well as in U.S. Pat. No. 5,072,652 entitled "Gripping Device Having Impact Cushioning Means" which issued to Blatt on Dec. 17, 1991; U.S. Pat. No. 3,635,514 entitled "Dual Grip Automation Jaw Swivel Assembly" which issued to Blatt on Jan. 18, 1972; and U.S. Pat. No. 3,013,835 entitled "Power Operated Jaw Assembly" which issued to Blatt on Dec. 19, 1961.

It has recently become desirable to prevent the gripper arms from opening if there is a loss of fluid pressure. It would also be desirable to mechanically limit the movement of the gripping arms in various positions independent of the inaccuracies of fluid pressure upon the piston. It would further be desirable to easily interchange differing gripper pad configurations. However, many traditional grippers fail to fully achieve these desired features.

In accordance with the present invention, a preferred embodiment of a universal gripper has a movable arm locked in a gripping position by abutting against a movable blocking member. In another aspect of the present invention, a pair of pivoting arms are maintained in their gripping positions by a blocking member being linearly slid between ends of the arms. In a further aspect of the present invention, varying movable arm configurations can be easily interchanged with each other and mounted to a body by way of a single fixed pivot pin. In yet a further aspect of the present invention, the opening angle of a gripper arm can be mechanically limited to various positions by selective positioning of an adjustment member. Moreover, another aspect of the present invention adjustably mounts a stop onto an external surface of a body for protecting a gripper arm from damage. An additional aspect of the present invention employs a partially cylindrical gripping pad shape for achieving easy interchangeability of differently configured pads.

The universal gripper of the present invention is highly advantageous over traditional grippers in that the moving gripper arms can be maintained in their gripping positions even during loss of piston fluid pressure. This eliminates undesired opening of the gripper arms which can lead to inadvertent dropping and damage of the workpiece. The specific shapes of the arms as well as the ability to move the blocking member relative to the body and arms allow for improved precision and control of the arm movements, smoother and less "jerking" movement of the components so as to reduce stress and premature failure. The present invention further provides for a more compact assembly, reduced manufacturing and raw material costs by eliminating component parts, while insuring precise and repeatable gripping pressure on the workpiece whether or not fluid pressure is applied to the piston.

The present invention is also advantageous by maximizing linear and pivoting mechanical advantages to supply superior gripping force; for example, 80 pounds per square inch of pneumatic force at the piston has been found to produce between 300 and 500 pounds of gripping force. Additionally, the arms can be easily interchanged between various fixed and pivoting configurations by removing only one otherwise fixed pivot pin. Moreover, a variety of gripping pads are interchangeably mounted upon the specifically configured arms. The arms and pads can be reconfigured within three minutes by pulling a single pin or by removing a single screw, respectively. This allows for quick changes so as to minimize expensive down time while being adapted for many workpieces. The specific shape and fastening of the universal gripper pads encourage easy installation and very secure mounting while being adjustment free, thereby further minimizing down time while improving gripper precision, which leads to improved workpiece positioning and processed quality. Additional advantages and features of the present invention will become apparent from the following description and appended claims, taken in conjunction with the accompanying drawings.

BRIEF DESCRIPTION OF THE DRAWINGS

FIG. 1 is a perspective view showing a first preferred embodiment of a universal gripper of the present invention;

FIG. 2 is an exploded perspective view showing the first preferred embodiment of the universal gripper of the present invention;

FIG. 3 is a side elevational view of the first preferred embodiment of the universal gripper of the present invention;

FIG. 4 is a top elevational view of the first preferred embodiment of the universal gripper of the present invention;

FIG. 4A is an enlarged cross sectional view, taken along line 4A—4A of FIG. 4, showing the first preferred embodiment of the universal gripper of the present invention;

FIG. 5 is an end elevational view showing the first preferred embodiment of the universal gripper of the present invention;

FIG. 7 is a fragmentary top elevational view showing the first preferred embodiment of the universal gripper of the present invention;

FIG. 8 is a side elevational view showing the preferred embodiment of a body employed in the universal gripper of the present invention;

FIG. 9 is a top elevational view showing the preferred embodiment of the body employed in the universal gripper of the present invention;

FIG. 10 is an end elevational view showing the preferred embodiment of the body employed in the universal gripper of the present invention;

FIG. 11 is an end elevational view, taken opposite that of FIG. 10, showing the preferred embodiment of the body employed in the universal gripper of the present invention;

FIG. 17 is a top elevational view showing the preferred embodiment of the slide employed in the universal gripper of the present invention;

FIG. 18 is an end elevational view showing the preferred embodiment of the slide employed in the universal gripper of the present invention;

FIG. 19 is an end elevational view, taken opposite that of FIG. 18, showing the preferred embodiment of the slide employed in the universal gripper of the present invention;

FIG. 20 is a side elevational view showing the first preferred embodiment of an upper arm employed in the universal gripper of the present invention;

FIG. 20A is an enlarged and fragmented side elevational view showing a section of the preferred embodiment of the upper gripping arm employed in the universal gripper of the present invention;

FIG. 20B is an enlarged and fragmented perspective view showing a section of an alternate embodiment of the upper gripping arm employed in the universal gripper of the present invention;

FIG. 20C is an enlarged and fragmented side elevational view showing a section of the alternate embodiment of the upper gripping arm employed in the universal gripper of the present invention;

FIG. 21 is a top elevational view showing the first preferred embodiment of the upper arm employed in the universal gripper of the present invention;

FIG. 22 is an end elevational view showing the first preferred embodiment of the upper arm employed in the universal gripper of the present invention;

FIG. 23 is a side elevational view showing a second preferred embodiment of a lower arm employed in the universal gripper of the present invention;

FIG. 24 is a top elevational view showing the second preferred embodiment of the lower arm employed in the universal gripper of the present invention;

FIG. 25 is an end elevational view showing the second preferred embodiment of the lower arm employed in the universal gripper of the present invention;

FIG. 26 is a side elevational view showing the preferred embodiment of an adjustment pin employed in the universal gripper of the present invention;

FIG. 27 is an end elevational view showing the preferred embodiment of the adjustment pin employed in the universal gripper of the present invention;

FIG. 32 is a diagrammatic side view showing the orientation of the arm, roller mechanism and slide with the adjustment pin positioned at a forty-five degree (45°) angle setting for the first preferred embodiment of the universal gripper of the present invention;

FIG. 33 is a diagrammatic side view showing the orientation of the arm, roller assembly and slide with the adjustment pin positioned at a thirty degree (30°) setting for the first preferred embodiment of the universal gripper of the present invention;

FIG. 34 is a diagrammatic side view showing the orientation of the upper arm, lower arm, roller assembly and slide in a closed gripping position for the first preferred embodiment of the universal gripper of the present invention;

FIG. 35 is a side elevational view showing an alternate embodiment of the workpiece stop employed in the universal gripper of the present invention;

FIG. 36 is a top elevational view showing the alternate embodiment of the workpiece stop employed in the universal gripper of the present invention;

FIG. 37 is a side elevational view showing a preferred embodiment of a tube mount and swivel employed with the universal gripper of the present invention;

FIG. 38 is a front elevational view showing the preferred embodiment of the tube mount employed with the universal gripper of the present invention;

FIG. 54A is a perspective view showing the preferred embodiment of a single soft gripping pad employed in the universal gripper of the present invention;

FIG. 55 is a side elevational view showing the preferred embodiment of the single soft gripping pad employed in the universal gripper of the present invention;

FIG. 56 is a top elevational view showing the preferred embodiment of the single soft gripping pad employed in the universal gripper of the present invention;

FIG. 57 is an exploded front elevational view showing the preferred embodiment of the single soft gripping pad employed in the universal gripper of the present invention;

DETAILED DESCRIPTION OF THE PREFERRED EMBODIMENT

Figure 6:
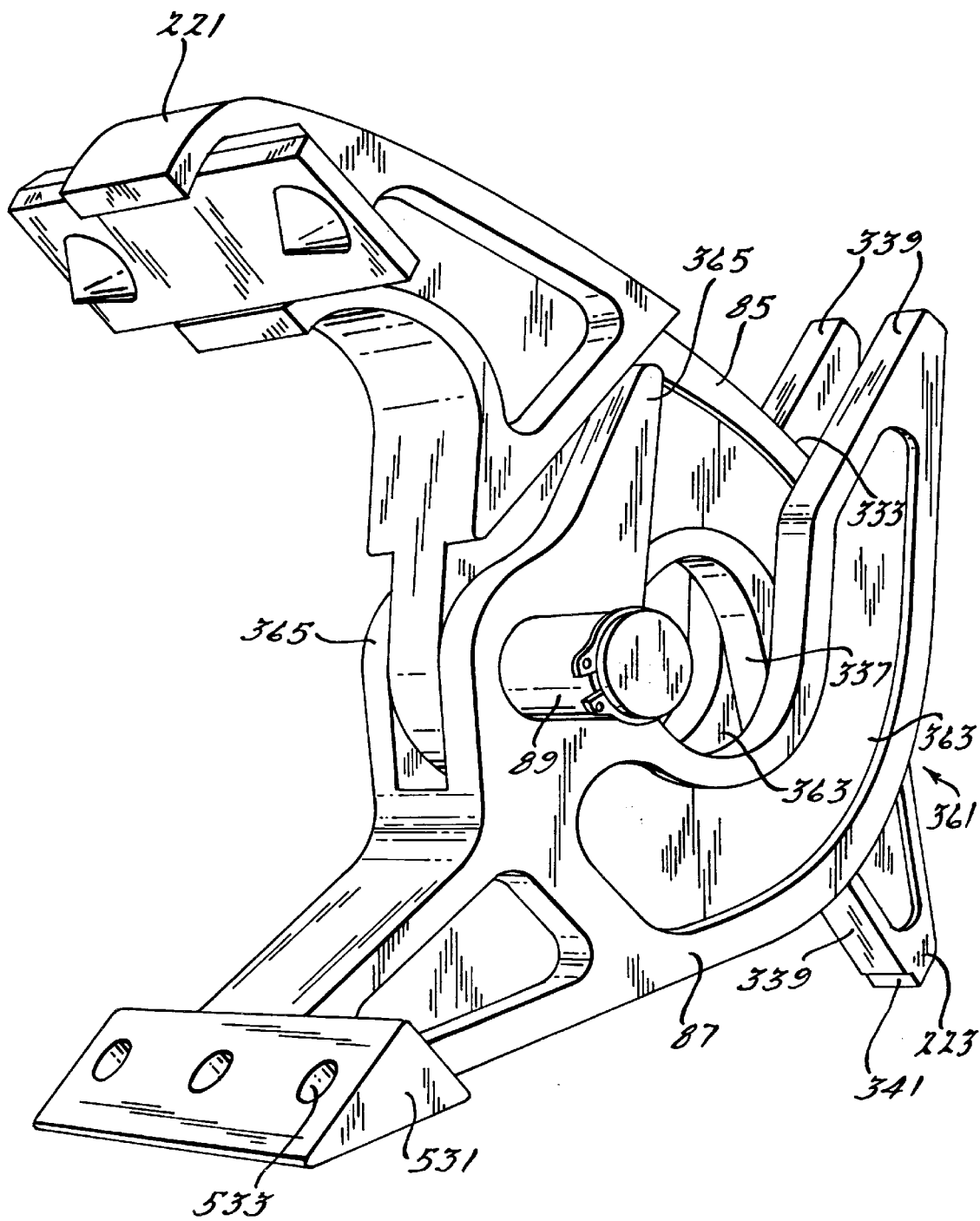
FIG. 6 is a perspective view showing a fourth preferred embodiment of the arms of the universal gripper of the present invention.
Figure 12:
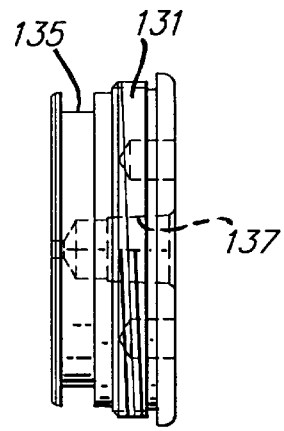
FIG. 12 is a side elevational view of the preferred embodiment of an end cap employed in the universal gripper of the present invention.
Figure 13:
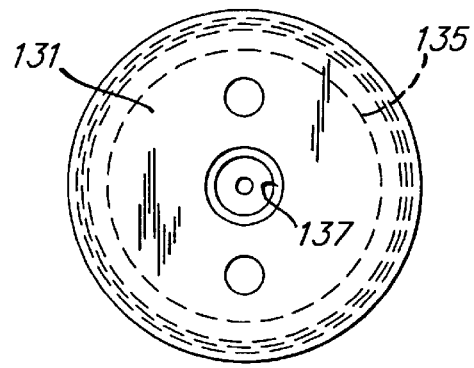
FIG. 13 is an end elevational view showing the preferred embodiment of the end cap employed in the universal gripper of the present invention.
Figure 14:
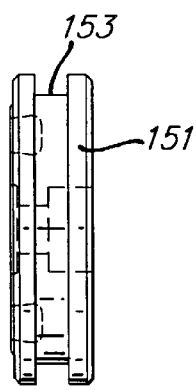
FIG. 14 is a side elevational view showing the preferred embodiment of a piston employed in the universal gripper of the present invention.
Figure 15:
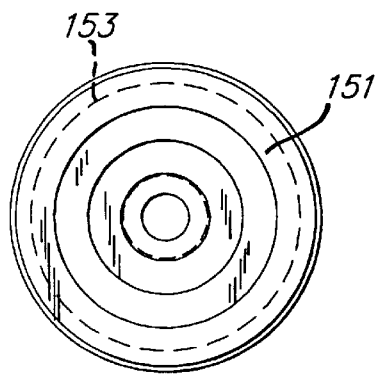
FIG. 15 is an end elevational view showing the preferred embodiment of the piston employed in the universal gripper of the present invention.
Figure 16:
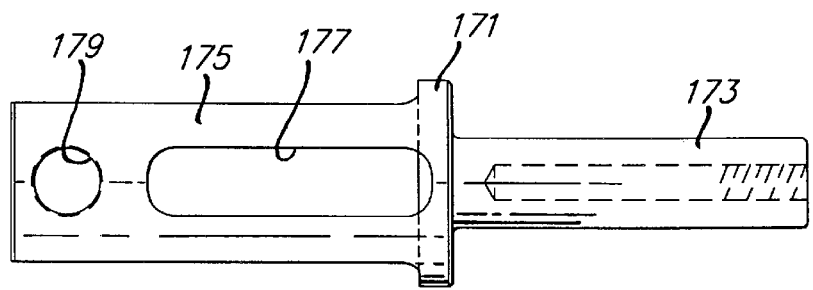
FIG. 16 is a side elevational view showing the preferred embodiment of a slide employed in the universal gripper of the present invention.
Figure 28:
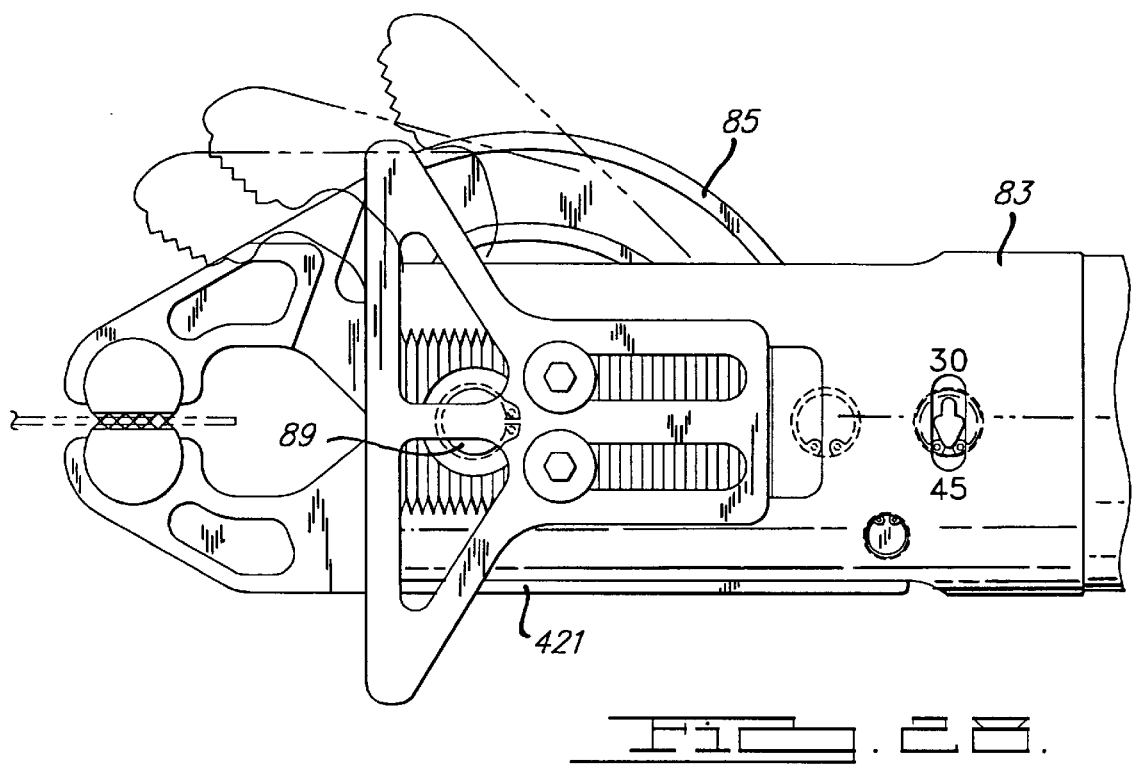
FIG. 28 is a fragmentary side elevational view showing a second preferred embodiment of the universal gripper of the present invention.

Referring to FIGS. 1 and 2, the first preferred embodiment of a universal gripper 81 includes a gripper body 83, a moving upper arm 85, a moving lower arm 87, a pivot pin 89, an adjustment or stop pin 91, a tube mount 93, a swivel 95 and an extension tube 97. Extension tube 97 may be stationarily mounted in place to a fixture or be attached to a movable robotic arm.

As can best be observed in FIGS. 8–11, body 83 has a circular cylindrical external surface 101 located closest to a proximal end 103 and bifurcated legs 105 located closest to a distal end 107. Bifurcated legs 105 are separated by a through-slot 109. A central bore 111, having a circular-cylindrical shape is internally disposed in a longitudinal orientation within body 83. A piston chamber 113 is also disposed within proximal end of body 83. A rod passageway 115 longitudinally connects bore 111 with piston chamber 113. An air inlet/outlet 121 provides access between piston chamber 113 and an externally coupled pneumatic or other fluid pressure device (not shown). A set of lateral serrations 123 are disposed along flattened external surfaces of bifurcated legs 105. Serrations 123 have a sixty degree (60°) angle between each other. Body 83 is preferably machined on a lathe and then milling machines and drill presses from round stock 6061-T651 aluminum. After machining, body 83 is hard coated or anodized to approximately a Rockwell C hardness of 70.

Referring to FIGS. 3, 4, 12 and 13, an end cap 131 is secured to the distal end of body 83. An o-ring 133 serves to seal between a peripheral groove 135 of end cap 131 and piston chamber 113 of body 83. An air inlet/outlet 137 couples the pneumatic device (not shown) to piston chamber 113. End cap 131 is manufactured in the same manner and from the same materials as is body 83.

Referring now to FIGS. 3, 4, 14 and 15, a piston 151 is coaxially disposed within piston chamber 113 internal to end cap 131. A peripheral groove 153 retains an o-ring 155 which seals against the internal surface defining piston chamber 113. Accordingly, piston 151 longitudinally and linearly travels away from the proximal end of body 83 when air enters inlet 137. Similarly, piston 151 travels longitudinally and linearly toward the proximal end of body 83 when air is forced into inlet 121. Piston 151 is machined on a lathe and then with milling and drill machines from 6061-T651 aluminum but is not hard coated.

A slide 171 is shown in FIGS. 3, 4 and 16–19. Slide has a piston rod 173 and a clevis 175. A longitudinally elongated slot 177 and an aperture 179 are machined within each branch of clevis 175. Piston rod 173 is bolted to piston 151 for coincidental longitudinal and linear movement. Slide is machined from 4150 pre-heat treated hot rolled steel with a flash chrome finish.

Referring now to FIGS. 2–5 and 7, a roller assembly 201 includes an inner roller 203 and two outer rollers 205, all of which are journalled about a roller pin 207. Roller assembly 201 also acts as a blocking member as will be later described. A thrust washer 208 is disposed between each adjacent pair of rollers. Snap rings 209 are snapped onto the laterally outboard ends of roller pin 207 for retaining roller pin 207 to apertures 179 of slide 171. Rollers 203 and 205 are made from 6150 hot rolled steel, then hardened and ground to a Rockwell C hardness of 54–58. Roller pin 607 is made from 12L14 cold finished steel that is carburized and hardened to a Rockwell C hardness of 46–50.

FIGS. 6, 20, 20A, 21, 22 and 34 show first and fourth preferred embodiments of arms 85 and 87. The first and fourth preferred embodiments both employ pivoting upper and lower gripping arms with the only difference between the embodiments being in the ends closest to the gripping pads. Upper arm 85 has a gripping end 221 and a trailing end 223. A claw 225 joins to a thicker lateral thickness of gripping end 221. Claw 225 is defined by a first finger 227 and a second off-set and opposing finger 229. An arm pivot hole 331 is disposed within finger 229. Finger 227 has an arcuate external, peripheral edge 333. A camming surface 335 is disposed along an internal edge of claw 225. Camming surface 335 has an arcuate portion 337, a five degree (5°) (relative to the longitudinal axis of body 83) angled or tapered flat section 339 and a stepped or indented flat section 341. An angled section 343 of camming surface 335 is disposed along finger 229.

In the alternate embodiment shown in FIGS. 20B and 20C, indented section 341 of camming surface 335 is replaced by a series of radiused grooves oriented in a lateral direction across tapered section 339.

Referring now to FIGS. 6 and 34, lower gripping arm 87 has a claw 361 defined by fingers 363 and 365. Unlike the unitary claw of upper arm 85, claw 361 of lower arm 87 is laterally bifurcated such that claw 225 of upper arm 85 can movably pass between claws 361. The camming surface of lower arm 87 is generally identical to that of upper arm 85 (with common reference numbers used to denote the various sections) with the exception that lower arm 87 does not include indented section 341 in its preferred embodiment. The arms are preferably cast from 4140 hot rolled steel and then hardened to a Rockwell C hardness of 44–48.

As can be observed in FIGS. 1, 3, 4, 7 and 34, pivot pin 89 pivotably couples upper arm 85 and lower arm 87 to body 83. A pair of snap rings 401 serve to retain pivot pin 89 to body 83. When affixed to body 83, pivot pin 89 is maintained in a fixed position and prevented from longitudinal or lateral movement. Therefore, in the preferred embodiments, arms 85 and 87 are only pivotably moved between various open positions (shown in phantom in FIG. 3) to a closed gripping position (as shown in solid lines). Notwithstanding, pivot pin 89 can be easily removed from body 83 by use of a simple snap ring pliers.

This allows for easy interchangeability of the preferred arm embodiments which all have a common attachment hole for receiving pivot pin 89. As can be further observed, trailing end 223 of each gripping arm 85 and 87 is disposed with internal tube body 83 within slot 109. Pivot pin 89 is preferably made from 12L14 cold finished steel that is carburized and hardened to a Rockwell C hardness of 46–50.

Referring now to FIGS. 23–25, 28 and 29, second and third preferred embodiments of the universal gripper of the present invention are shown employing fixed lower arms 421. Each fixed lower arm 421 has bifurcated fingers 423 with flat camming surfaces 425 and flat external surfaces 427. Each trailing end 429 of lower arms 421 has slot 431 which is inserted within the slot of body 83 prior to insertion of pivot pin 89 for engagement with a laterally oriented rod 435 secured to body 83 by snap rings.

The arm embodiments of FIGS. 1–5 and 20–25 all have gripping ends 221 with a partially circular channel 501 which receives a mating partially circular cylindrical external retaining surface of gripping pad 503, the various embodiments of which will be described in greater detail hereinafter. Channel 501 has a side view C-shape of approximately three quarters (¾) of a circle with an opening. A counter-bore 505 extends from a peripheral edge of each arm to the deepest portion of channel 501. A threaded anti-rotating bolt 511 is disposed within counter-bore 505 for engaging with a threaded hole 513 in gripping pad 503. An enlarged head of bolt 511 has a blind hexagonal recess for receiving a mating wrench. Accordingly, bolt 511 and gripping pad 503 are allowed to rotate plus or minus five degrees (5°) in a longitudinal direction but are prevented from moving laterally relative to the arms once assembled together. However, the various pad embodiments can be easily removed and interchanged with each other by disengagement of the single bolt in each arm. Bolt 511 is preferably made from 4150 pre-heat treated hot rolled steel having a Rockwell C hardness of 28–32 and with a black oxide coating.

Figure 29:
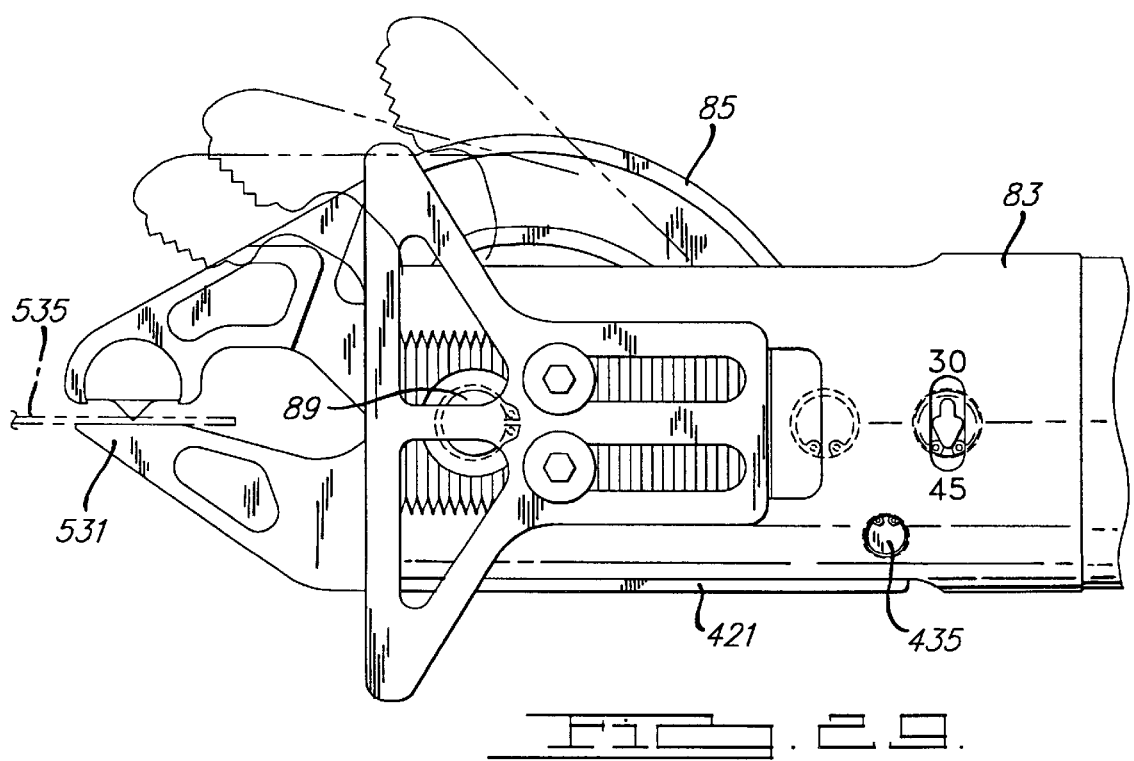
FIG. 29 is a fragmentary side elevational view showing a third preferred embodiment of a universal gripper of the present invention.
Figure 30:
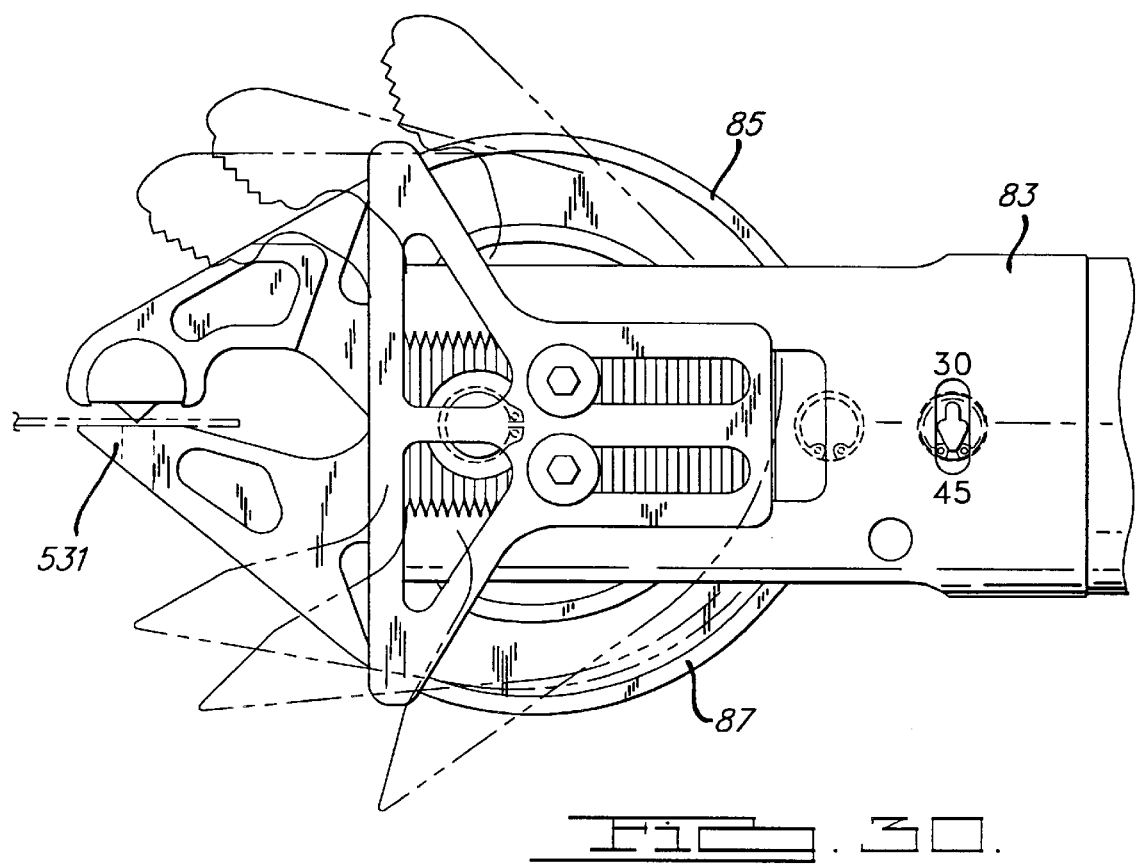
FIG. 30 is a fragmentary side elevational view showing the fourth preferred embodiment of the universal gripper of the present invention.
Figure 31:
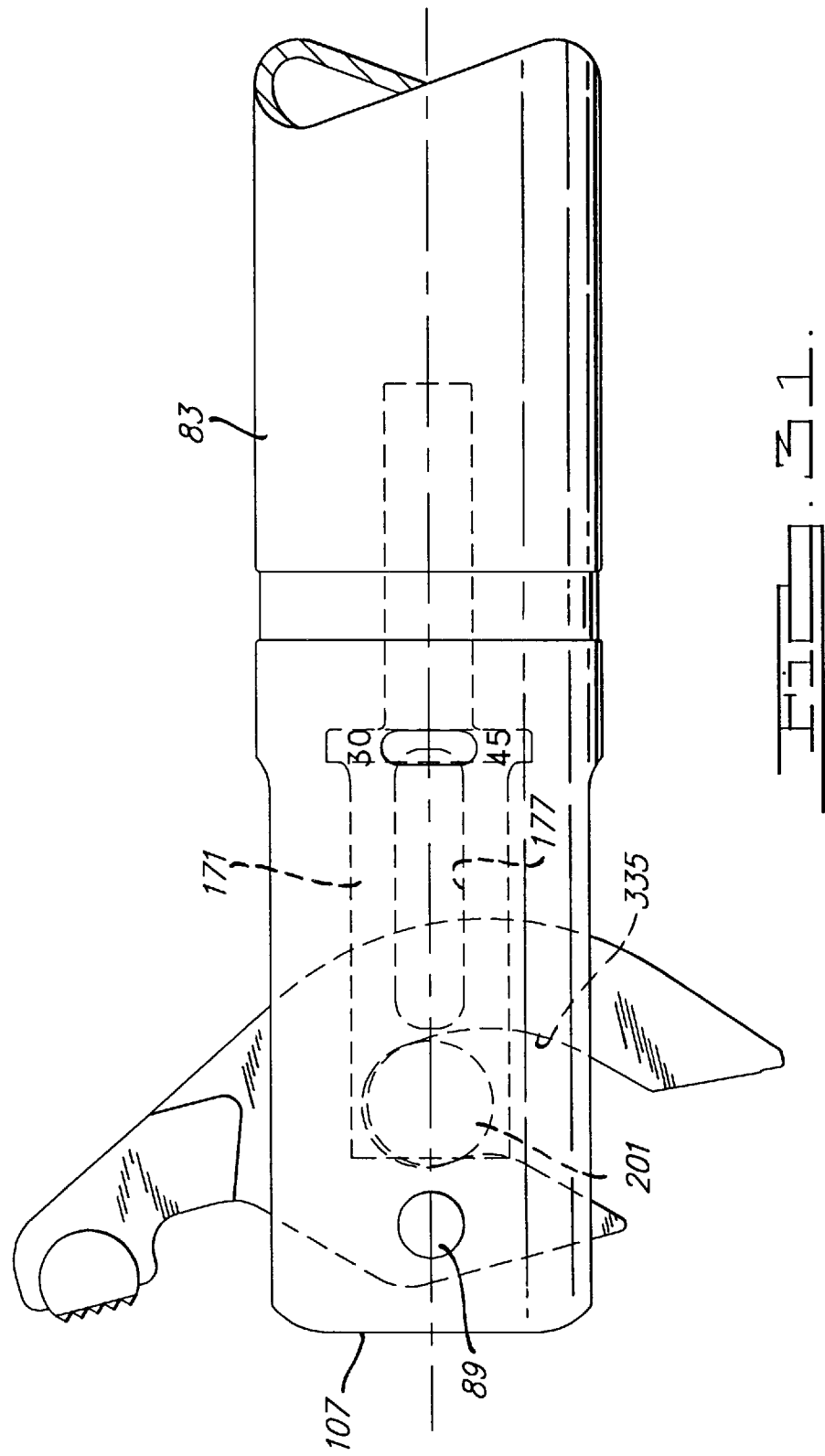
FIG. 31 is a diagrammatic side view showing the orientation of the arm and slide with the adjustment pin removed for the first preferred embodiment of the universal gripper of the present invention.
Figure 39:
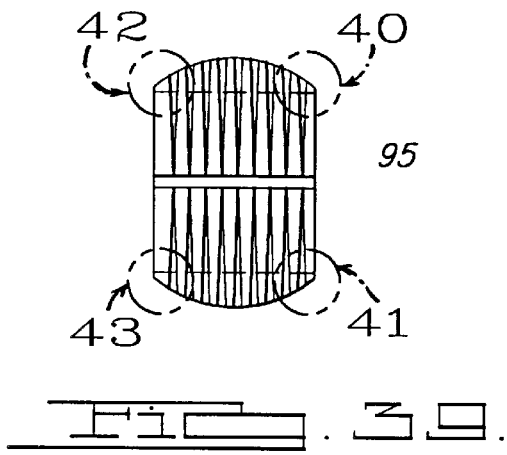
FIG. 39 is a side elevational view showing the preferred embodiment of the swivel employed with the universal gripper of the present invention.
Figure 40:
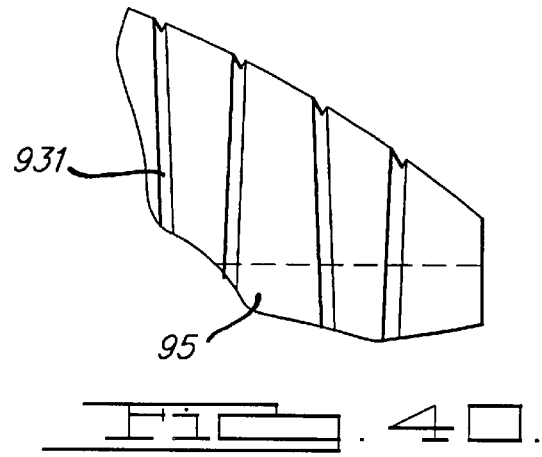
FIG. 40 is an enlarged fragmentary side elevational view, taken within circle 40 of FIG. 39 showing the preferred embodiment of the swivel employed with the universal gripper of the present invention.
Figure 41:
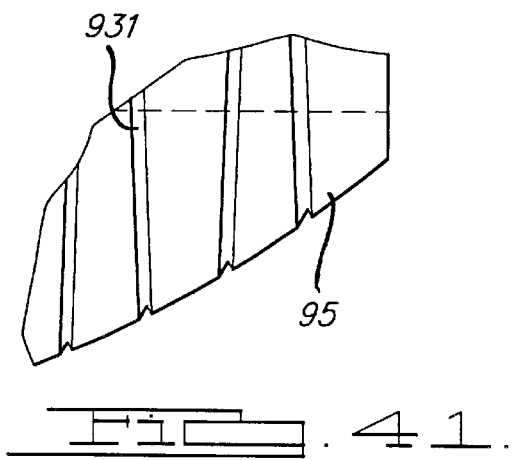
FIG. 41 is an enlarged fragmentary side elevational view, taken within circle 41 of FIG. 39 showing the preferred embodiment of the swivel employed with the universal gripper of the present invention.
Figure 42:
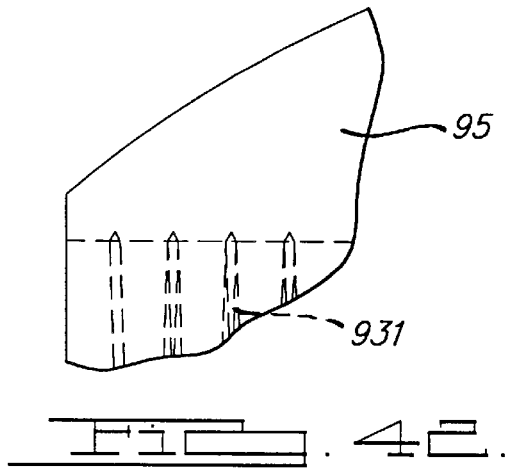
FIG. 42 is an enlarged fragmentary side elevational view, taken within circle 42 of FIG. 39 showing the preferred embodiment of the swivel employed with the universal gripper of the present invention.
Figure 43:
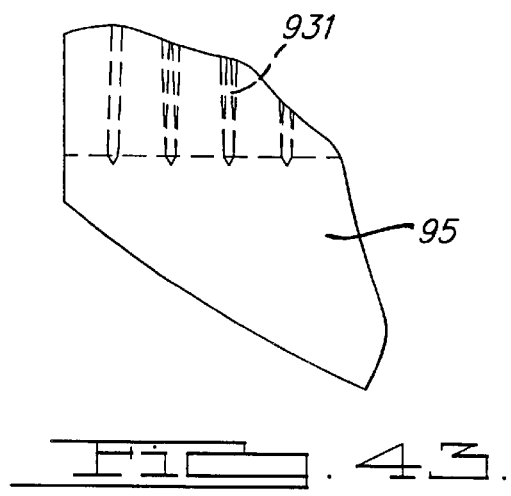
FIG. 43 is an enlarged fragmentary side elevational view, taken within circle 43 of FIG. 39 showing the preferred embodiment of the swivel employed with the universal gripper of the present invention.
Figure 44:
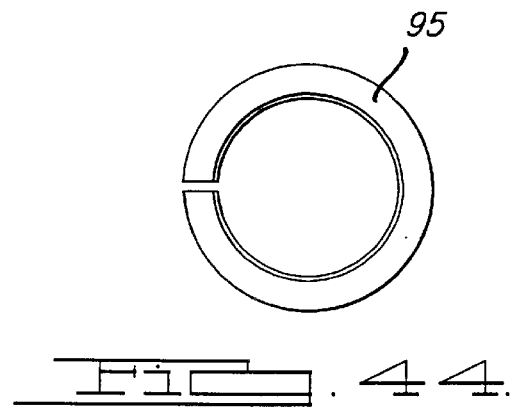
FIG. 44 is a fragmentary front elevational view showing the preferred embodiment clamping portion of the tube mount employed with the universal gripper of the present invention.
Figure 44A:
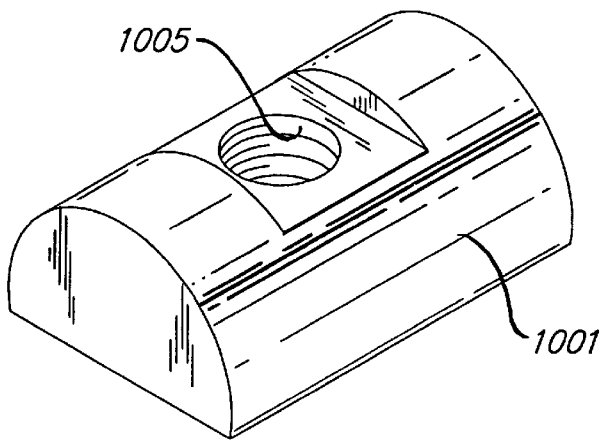
FIG. 44A is a perspective view showing the preferred embodiment of a single cone point gripping pad employed with the universal gripper of the present invention.
Figure 45:
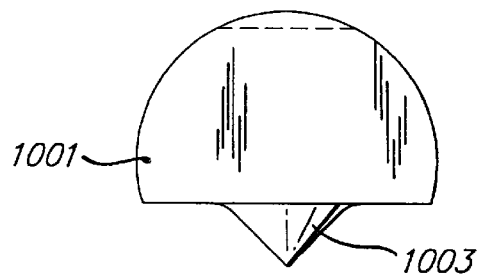
FIG. 45 is a side elevational view showing the preferred embodiment of the single cone point gripping pad employed in the universal gripper of the present invention.
Figure 46:
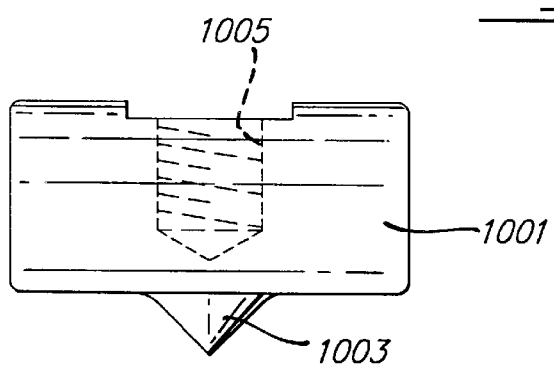
FIG. 46 is a front elevational view showing the preferred embodiment of the single cone point gripping pad employed in the universal gripper of the present invention.
Figure 47:
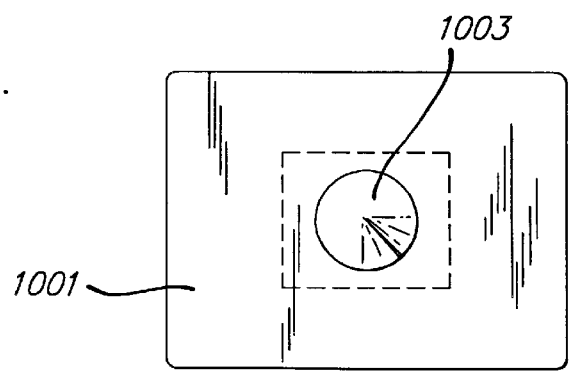
FIG. 47 is a bottom elevational view showing the preferred embodiment single cone point gripping pad employed in the universal gripper of the present invention.
Figure 47A:
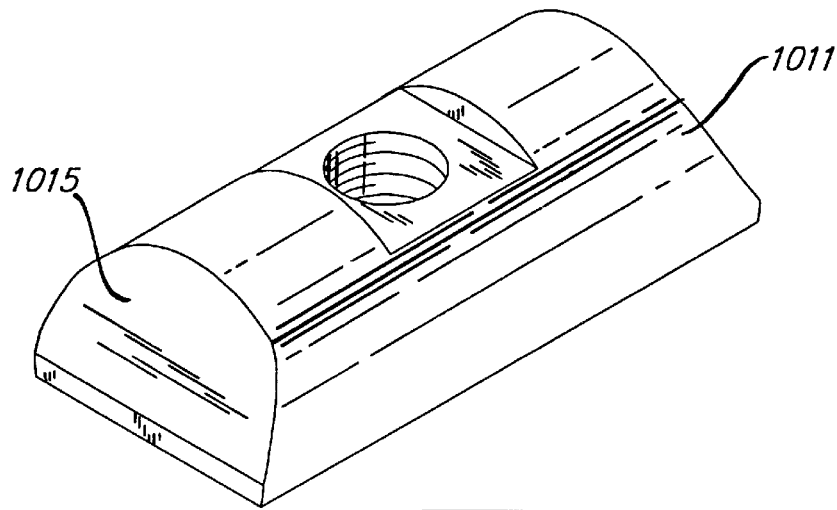
FIG. 47A is a perspective view showing the preferred embodiment of a double cone point gripping pad employed in the universal gripper of the present invention.
Figure 48:
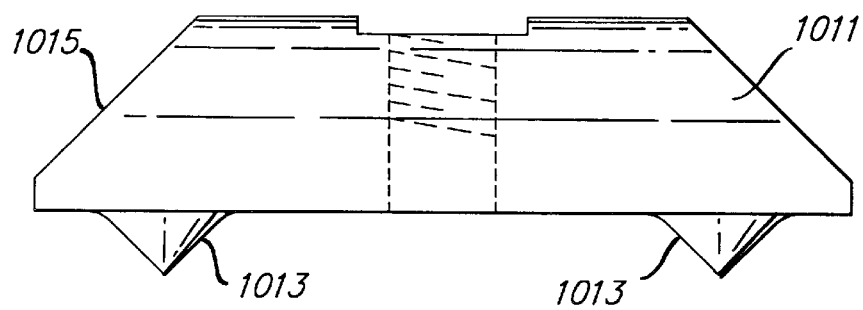
FIG. 48 is a front elevational view showing the preferred embodiment of the double cone point gripping pad employed in the universal gripper of the present invention.
Figure 49:
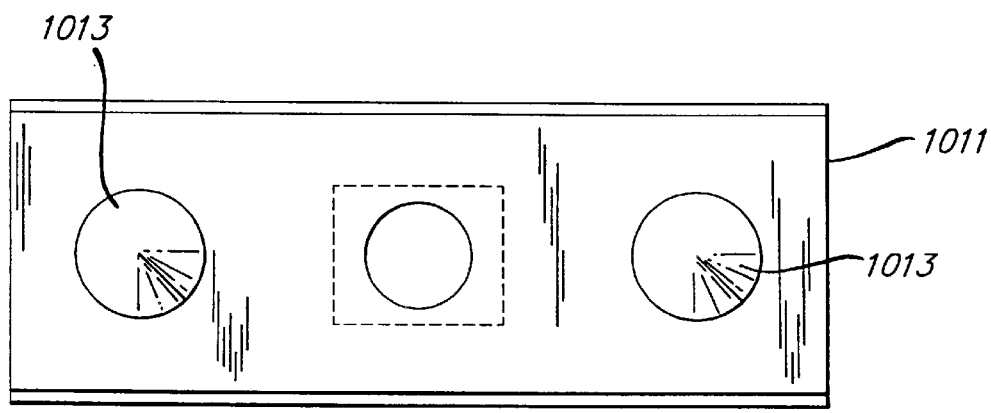
FIG. 49 is a bottom elevational view showing the preferred embodiment of the double cone point gripping pad employed in the universal gripper of the present invention.
Figure 49A:
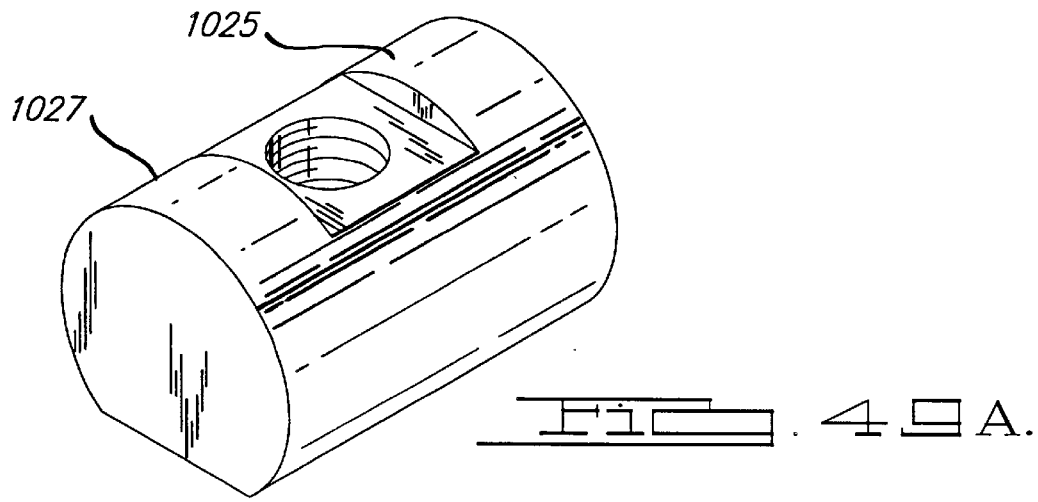
FIG. 49A is a perspective view showing the preferred embodiment of a single standard gripping pad employed in the universal gripper of the present invention.
Figure 50:
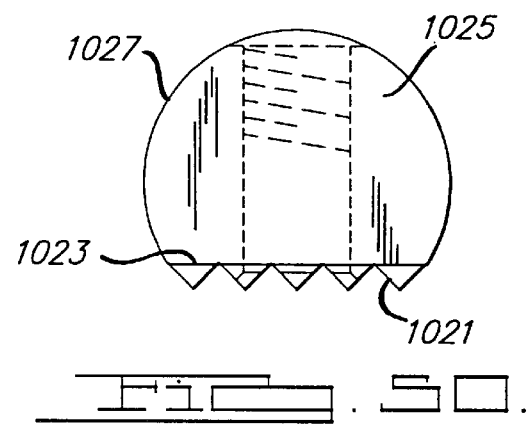
FIG. 50 is a side elevational view showing the preferred embodiment of the single standard gripping pad employed in the universal gripper of the present invention.
Figure 51:
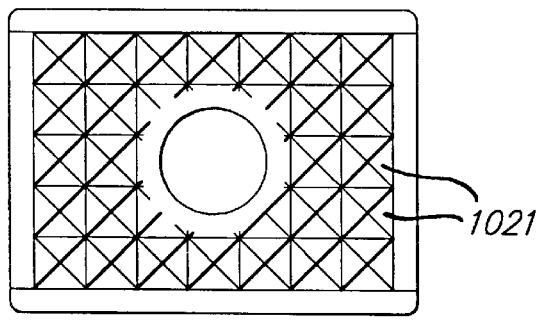
FIG. 51 is a bottom elevational view showing the preferred embodiment of the single standard gripping pad employed in the universal gripper of the present invention.
Figure 52:
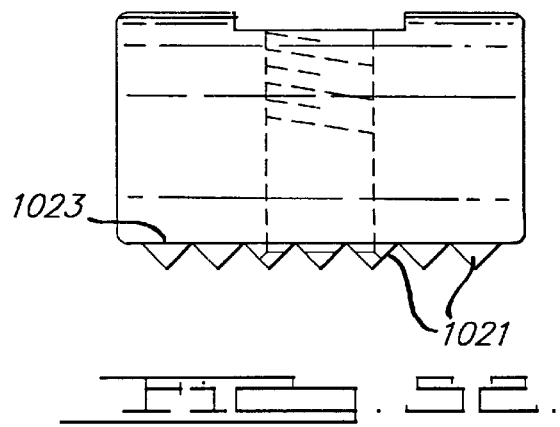
FIG. 52 is a front elevational view showing the preferred embodiment of the single standard gripping pad employed in the universal gripper of the present invention.
Figure 52A:
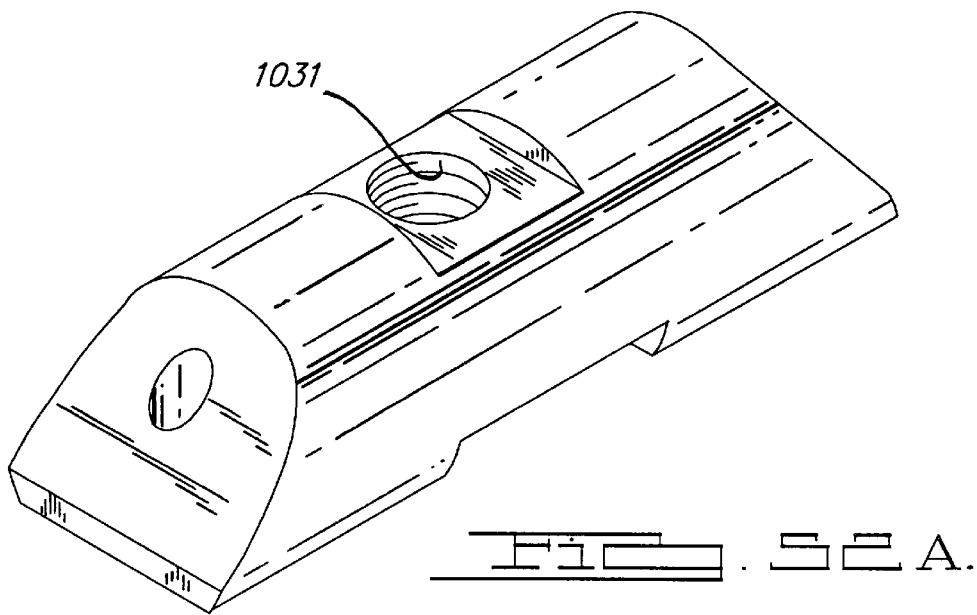
FIG. 52A is a perspective view showing the preferred embodiment of a double standard gripping pad employed in the universal gripper of the present invention.
Figure 53:
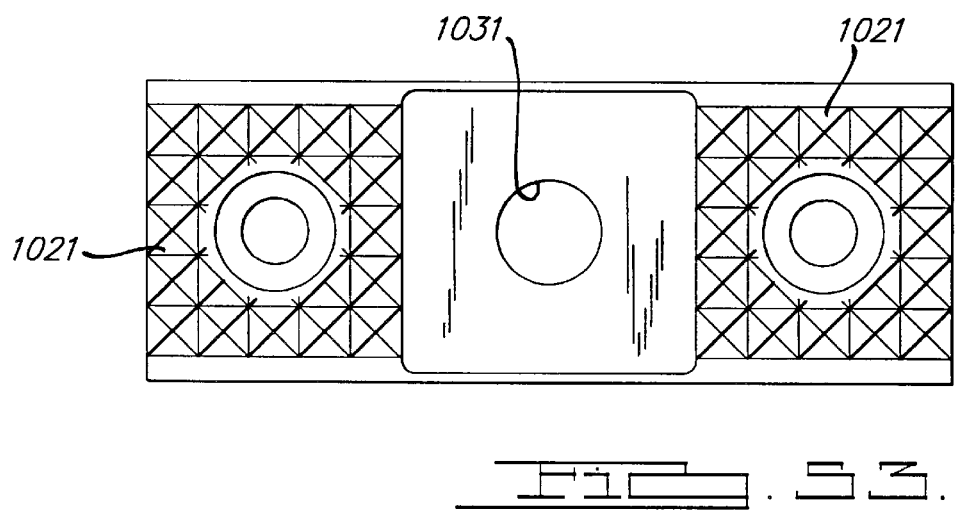
FIG. 53 is a bottom elevational view showing a preferred embodiment of the double standard gripping pad employed in the universal gripper of the present invention.
Figure 54:
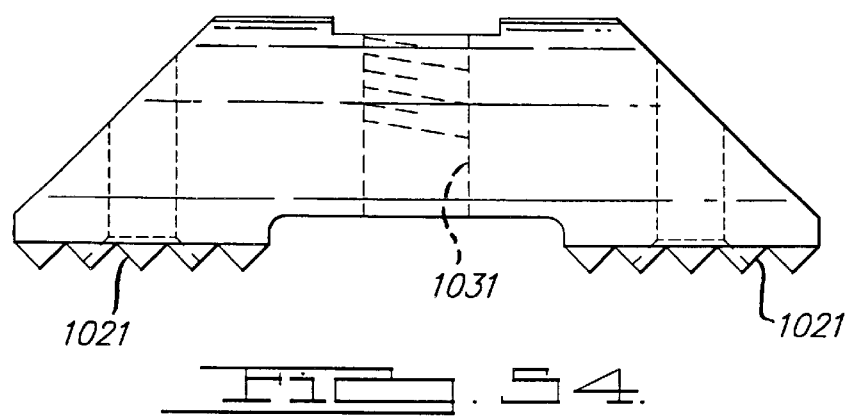
FIG. 54 is a front elevational view showing the preferred embodiment of the double standard gripping pad employed in the universal gripper of the present invention.
Figure 57A:
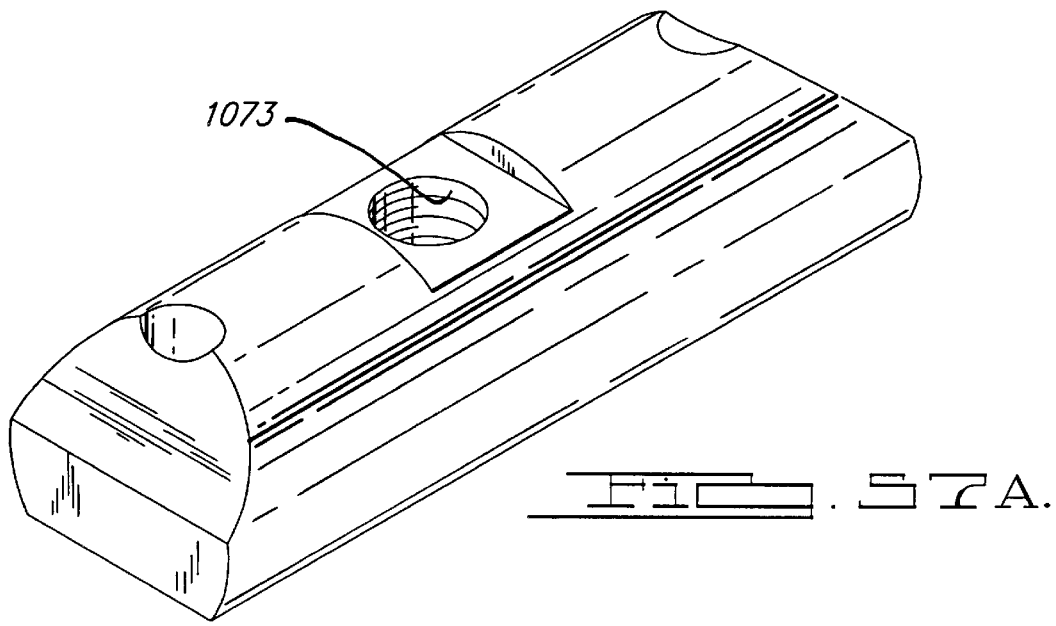
FIG. 57A is a perspective view showing the preferred embodiment of a double soft gripping pad employed in the universal gripper of the present invention.
Figure 58:
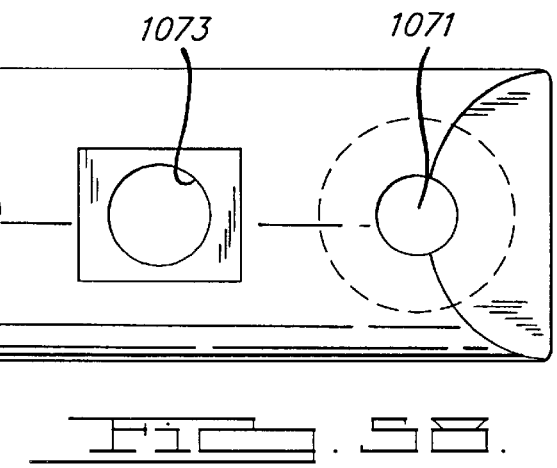
FIG. 58 is a top elevational view showing the preferred embodiment of the double soft gripping pad employed in the universal gripper of the present invention.
Figure 59:
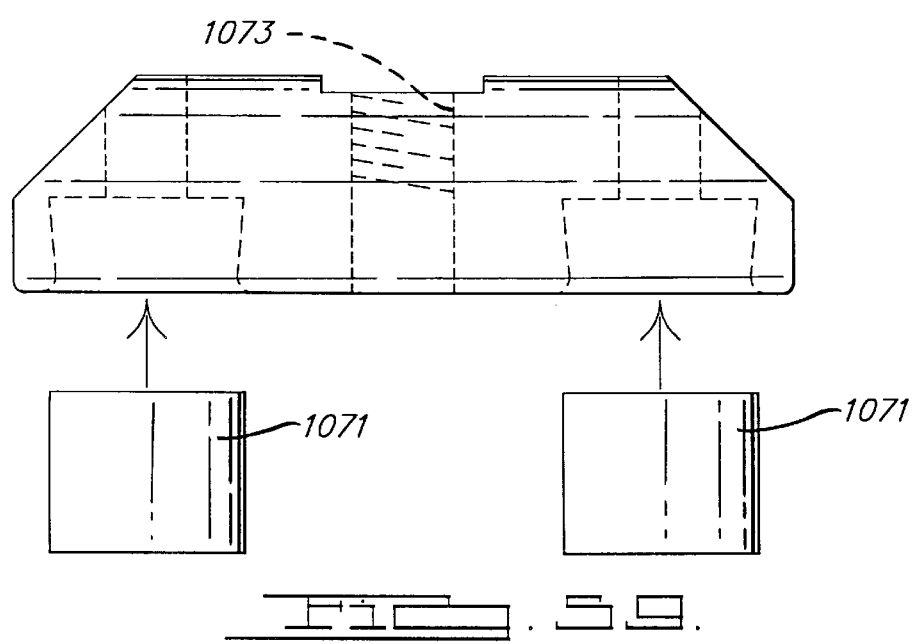
FIG. 59 is an exploded front elevational view showing the preferred embodiment of the double soft gripping pad employed in the universal gripper of the present invention.

The lower arm embodiments of FIGS. 6, 29 and 30 all use a chisel point gripping section 531. No extra gripping pad needs to be attached to each arm. For the embodiments shown, one or two conical recesses 533 are disposed within gripping portion 531 for alignment with the conical projections extending from the gripping pads. The chisel points serve to pick up or shovel underneath a workpiece 535 to thereby assist in the eventual gripping.

Stop or adjustment pin 91 can best be observed in FIG. 3, 7, 26 and 27. Adjustment pin 91 has a cylindrical shaft 601 with an indented flat 603 machined within one side. A head 605 has a pair of parallel flat sides 607 which mate in a keyhole manner with a circumferentially elongated slot 609 machined in the external surface of body 83. An arrow head is raised or recessed within head 605. Adjustment pin 91 is laterally disposed internal to body 83 such that shaft 601 and flat 603 bridge across bore 111. A snap ring 621 juxtapositioned around a base 623 of adjustment pin 91 retains adjustment pin 91 to body 83 and must be removed to reorient or remove adjustment pin 91. Shaft 601 and flat 603 are circumferentially surrounded by slot 177 of slide 171.

The operation of the moving arms 85 and 87 in response to linear travel of slide 171 and roller assembly 201 can be explained by observing FIGS. 7 and 31–34. When adjustment pin 91 is removed, as in FIG. 31, slide is linearly pushed toward distal end 107 of body 83 such that roller assembly 201 rides along angled section 343 of each camming surface 335. This causes each moving arm 85 (and 87, not shown) to move to a fully opened position.

FIGS. 7 and 32 illustrate adjustment pin 91 oriented in a forty-five degree (45°) open position wherein flat 603 faces away from distal end 107 of body. Accordingly, slide 171 is longitudinally slid toward distal end 107 until a trailing end of slot 177 abuts against flat 603. Therefore, roller assembly 201 only rides along camming surface 335 a predetermined distance. Hence, arm 805 (and arm 87, not shown) are only allowed to rotate to a forty-five degree (45°) open position relative to a longitudinal center line 701.

FIG. 33 shows adjustment pin 91 oriented in a thirty degree (30°) open position wherein linear movement of slide 171 is limited when cylindrical shaft 601 abuts against the trailing end of slot 177. Thus, roller assembly 201 only opens arm 85 (and arm 87, not shown) to a thirty degree (30°) open position.

Finally, FIG. 34 shows arms 85 and 87 in a gripping or closed position engaging the workpiece. In this position, the piston retracts slide 171 which in turn wedges roller assembly 201 between trailing ends 223 of arms 85 and 87. Furthermore, center roller 203 engages indented section 341. This abutting and wedging action mechanically prevents gripping arms 85 and 87 from opening up and inadvertently releasing the workpiece even when piston pressure is not present. For the fixed lower arm embodiments, roller assembly 201 rides along the upper camming surface of each lower arm in order to prevent undesired misalignment or lateral movement of roller assembly 201 or slide 171. Hence, even with the fixed arm embodiments, roller assembly 201 is wedged and abuts between the arms when the arms are in a fully gripping position.

Referring to FIGS. 3–5, 35 and 36, two different embodiments of workpiece stops 800 are shown. Each stop embodiment has a central base leg 801 and a pair of upper legs 803 thereby defining a generally T-shape. Base leg 801 has a series of serrations 805 for adjustably engaging with serrations 123 of body 83. Base leg 801 further has a pair of parallel and longitudinally oriented slots 811 laterally off-set from each other. A threaded fastener 813 has a shaft disposed through longitudinally oriented slots 811 for engaging threaded holes 815 and body 83. Accordingly, stops 800 can be longitudinally adjusted relative to body 83. Each stop 800 is preferably made from 1018CDS steel which is carburized and hardened to a Rockwell C hardness of 44–48. Each stop 800 is much thinner than its width. Stops 800 are meant to protect the softer aluminum body from damage due to insertion and removal of the workpieces.

FIGS. 37–44 illustrate tube mount 93, swivel 95, extension tube 97 and a clamp ring 901. Tube mount 93 has a gripper body opening 903 of a circular-cylindrical shape for receiving gripper body 83. Until tightening, gripper body 83 can be longitudinally moved to various positions relative to tube mounts 93. A through-slot 905 extends from opening 903. A tube receptacle 907 is also disposed within tube mount 93 and is split in half by slot 905. Thus, tube mount 93 can be angularly or rotatably oriented both in a lateral rotational direction and a longitudinal rotational direction relative to swivel 95 and extension tube 97 prior to tightening of bolts 909 bridging across slot 905. A pair of clamp ring portions 901 of tube mount 93 are located within receptacle 907 for engaging a pair of circumferentially surrounding grooves 931 on an external and otherwise spherical surface of swivel 95. Swivel 95 is made from 4150 heat treated steel while tube mount is preferably made from 6061-T651 aluminum which is hard coated.

FIGS. 44A–47 illustrate a single cone point gripping pad 1001 having a single central conical projection 1003 coaxially aligned with a threaded aperture 1005. Pad 1001 is preferably made from 8620 cold finished steel which is carburized and hardened to a Rockwell C hardness of 58–62. FIGS. 47A–49 illustrate a double cone point gripping pad 1011 having a pair of laterally off-set conical projections 1013 and angled side walls 1015. FIGS. 49A–52 illustrate a single standard gripping pad having five rows by seven columns of pyramidal projections 1021 projecting from a theoretically flat surface 1023 of a pad body 1025. An external retaining surface 1027 of pad body 1025 has a circular-cylindrical shape making up approximately two-thirds (⅔) of a circle when viewed from the side (see FIG. 50). Each angled wall of each pyramid has a ninety degree (90°) angle relative to the adjacent wall of the next pyramid. FIGS. 52A–54 illustrate a double standard gripping pad similar to that of FIGS. 49A–52 except that a pair of pyramidal sections are employed laterally outboard of a central flat section containing a threaded aperture 1031. Furthermore, with this embodiment, a pair of angled outboard side walls are employed.

FIGS. 54A–57 illustrate a single soft gripping pad 1051 having a steel body 1053 and a urethane button 1055 fitting within a back tapered chamber 1057 of body 1053. Button 1055 sits proud of an otherwise flat surface 1059 of body 1053. FIGS. 57A–59 illustrate a double soft gripping pad like that of the prior embodiment except that a pair of buttons 1071 are positioned laterally outboard of a centrally located and threaded aperture 1073.

While the preferred embodiments of the universal gripper have been disclosed, it will be appreciated that various other shapes, parts and embodiments may be employed without departing from the spirit of the present invention.

The invention claimed is:

1. A gripper comprising:

a body;

an actuator mounted to said body;

a first arm movably coupled to said body, said first arm operably moving in response to movement of said actuator;

a camming surface located on one of said body and said first arm;

a member operably riding along said camming surface;

said member being moved to a blocking position abutting against a portion of said first arm when said first arm is in a gripping position so as to prevent movement of said first arm away from said gripping position until said actuator moves said member; and an indentation located in said camming surface, said member being located at said indentation for encouraging said first arm to remain in said gripping position even when moving pressure applied to said actuator is lost.

2. The gripper of claim 1 further comprising a second arm coupled to said body, said member being a roller mechanism, said roller mechanism riding against a portion of said second arm simultaneously with riding along said camming surface located on said first arm thereby substantially preventing movement of said first arm away from said gripping position until said actuator moves said member from between flat camming sections of said arms.

3. The gripper of claim 2 wherein:

said second arm pivots in relation to said body due to said member riding along a camming surface of said second arm;

said first and second arms move toward and away from each other, respectively, for gripping and releasing a workpiece between gripping ends of said arms.

4. The gripper of claim 2 wherein said flat camming section of said first arm outwardly tapers toward a gripping end of said first arm.

5. The gripper of claim 2 further comprising bifurcated fingers disposed on said second arm, a finger of said first arm having said camming surface operably passing between and at least partially past said bifurcated fingers of said second arm.

6. The gripper of claim 1 wherein said camming surface includes a flat section disposed adjacent to said indentation.

7. The gripper of claim 6 wherein said camming surface further includes an arcuate section against which said member rides for moving said first arm from an open position to said gripping position.

8. The gripper of claim 1 further comprising a trailing end of said first arm moving internal to said body.

9. The gripper of claim 1 further comprising:

a through slot disposed in a distal end of said body, said body having a substantially circular-cylindrical external shape;

a second arm pivotably coupled to said body;

gripping ends of said arms moving toward and away from each other;

trailing ends of said arms movably received in said slot in said body and crossing each other when said gripping ends are opened;

a pivot pin transversely extending through said body and intersecting said slot, said arms being journalled about said pivot pin; and a tube mount having an opening for receiving a proximal end of said body, a fastener bridging a slot of said tube mount whereby said body is firmly secured to said tube mount upon tightening of said fastener.

10. A gripper comprising:

a body;

an actuator mounted to said body;

a first arm movably coupled to said body, said first arm operably moving in response to movement of said actuator;

a camming surface disposed on said first arm;

rollers operably riding along said camming surface; and an indentation disposed adjacent said camming surface, said rollers being located at said indentation for encouraging said first arm to remain in a gripping position even when moving pressure applied to said actuator is not present.

11. The gripper of claim 10 wherein said rollers are moved to a blocking position abutting against a portion of said first arm when said first arm is in said gripping position so as to prevent movement of said first arm away from said gripping position until said actuator moves said rollers.

12. The gripper of claim 10 wherein said first arm includes a substantially U-shaped claw substantially opposite from a gripping end, said camming surface being disposed on portions of said claw, said rollers pushing one finger of said claw to move said arm toward a closed position and pushing an opposed second finger of said claw to move said first arm toward an open position.

13. The gripper of claim 10 further comprising:

a through slot disposed in a distal end of said body, said body having a substantially circular-cylindrical external shape;

a second arm pivotably coupled to said body;

gripping ends of said arms moving toward and away from each other;

trailing ends of said arms movably received in said slot in said body and crossing each other when said gripping ends are opened;

a pivot pin transversely extending through said body and intersecting said slot, said arms being journalled about said pivot pin;

a tube mount having an opening for receiving a proximal end of said body; and a fastener bridging a slot of said tube mount whereby said body is firmly secured to said tube mount upon tightening of said fastener.

14. A gripper comprising:

a body;

an actuator mounted to said body;

a camming surface;

a roller operably riding alone said camming surface;

a first arm movably coupled to said body, said first arm operably moving in response to movement of said actuator; and a plurality of laterally oriented grooves located on said camming surface;

said roller engaging one of said grooves when said first arm grips a workpiece, said roller being located at one of said grooves for encouraging said first arm to remain in a gripping position even when moving pressure applied to said actuator is lost.

15. The gripper of claim 14 further comprising a pivot, a second arm coupled to said body by said pivot, a cam follower including said roller riding on an edge of said second arm simultaneous to movement of said cam follower along said camming surface, said cam follower being located between a trailing end of said first arm and said edge of said second arm to substantially prevent movement of said first arm away from said gripping position until said cam follower is linearly moved away from said trailing end of said first arm.

16. The gripper of claim 15 further comprising bifurcated fingers disposed on said second arm, a finger of said first arm having said camming surface operably passing between and at least partially through said bifurcated fingers of said second arm.

17. The gripper of claim 16 wherein said second arm is stationarily fixed to said body, said second arm shares a common attachment point with said first arm.

18. The gripper of claim 14 further comprising a second arm having an edge, an arcuate and flat camming surface located on said edge of said second arm, a pivot, said second arm pivoting about said pivot, a trailing end of said second arm and a trailing end of said first arm moving internally in said body.

19. A gripper comprising:

a body;

an actuator mounted to said body;

a camming surface;

a member operably riding along said camming surface;

a first arm movably coupled to said body, said first arm operably moving in response to movement of said actuator;

an indentation disposed in said camming surface, said member being located at said indentation for encouraging said first arm to remain in a gripping position even when moving pressure applied to said actuator is lost; and a second arm stationarily fixed to said body, said second arm sharing a common attachment point with said first arm.

20. The gripper of claim 19 wherein said first arm includes a substantially U-shaped claw substantially opposite from a gripping end, said camming surface being disposed on portions of said claw, said member pushing one finger of said claw to move said first arm toward a closed position and pushing an opposed second finger of said claw to move said first arm toward an open position.

21. A gripper comprising:

a body;

an actuator movable in relation to said body;

a first arm movably coupled to said body;

an adjustment member attached to said body, said adjustment member having a cylindrical portion and a flattened portion; and a slide having an internal slot, said slot abutting against said cylindrical portion of said adjustment member when said adjustment member is in a first position and abutting against said flattened portion when said adjustment member is in a second position, said adjustment member being movable to said first position which limits movement of said first arm to a first predetermined angular position, said adjustment member also being movable to said second position which limits movement of said first arm to a second predetermined angular position greater than said first angular position.

22. The gripper of claim 21 wherein said adjustment member includes a pin rotatable from said first position to said second position.

23. The gripper of claim 22 wherein said adjustment member is fully removed from said body to allow full opening of said first arm.

24. The gripper of claim 21 wherein said adjustment member is removed to allow said first arm to move to a fully open angular position greater than said first and second angular positions.

25. The gripper of claim 21 further comprising a second arm movably coupled to said body, said adjustment member limiting movement of said second arm coincidental with that of said first arm.

26. The gripper of claim 21 wherein said adjustment member includes a head having an arm angle indicator, a constricted portion of said adjustment member fitting into a matching hole in said body for substantially preventing undesired movement of said adjustment member.

27. A gripper comprising:

a body;

an actuator movable in relation to said body;

a first arm movably coupled to said body;

an adjustment member attached to said body, said adjustment member being movable to a first position which limits movement of said first arm to a first predetermined angular position, said adjustment member also being movable to a second position which limits movement of said first arm to a second predetermined angular position greater than said first angular position;

a camming surface located on one of said body and said arm; and a roller mechanism slidable along said camming surface to control movement of said arm, said adjustment member selectively limiting linear travel of said roller mechanism.

28. The gripper of claim 27 wherein said adjustment member is at least partially removed from said body to said second position to allow full opening of said first arm.

29. A powered gripper comprising:

a body having a distal end with a slot;

a pivot pin transversely extending through said body and intersecting said slot;

a first arm pivotably supported by said pivot pin internal to said slot;

a second arm supported by said pivot pin internal to said slot, said second arm having a different shape than said first arm, said second arm being stationarily affixed to said body once assembled, said second arm being removable from said body solely by removal of said pivot pin, whereby two of said arms are operably usable with said body at a time; and a third arm having a hole suitable for receiving said pivot pin, said third arm having a different configuration than one of said first and second arms;

said pivot pin being linearly, stationarily fixed to said body during operable movement of at least one of said arms;

said pivot pin being removable to allow for interchangeability of said arms and reconfiguration of said powered gripper.

30. The gripper of claim 29 wherein said second arm has a chisel pointed gripping end.

31. The gripper of claim 29 further comprising a gripper pad secured to a gripping end of said second arm.

32. The gripper of claim 29 further comprising a protuberance transversely extending from a wall of said body substantially parallel to said pivot pin, said second arm including an elongated leg with a slotted opening engaging said protuberance, whereby said second arm is substantially prevented from movement once attached to said body and said second arm is removable from said body without removal of said protuberance.

33. The gripper of claim 29 wherein said first arm includes:

a gripping pad engaging section disposed at a leading end of said first arm;

a curved peripheral edge section externally extending from said body;

a trailing end internally disposed in said body; and a camming surface;

said pivot pin being longitudinally attached to said first arm substantially between said ends.

* * * * *

UNITED STATES PATENT AND TRADEMARK OFFICE
CERTIFICATE OF CORRECTION

| | | |
|---|---|---|
| PATENT NO. | : | 5,853,211 |
| DATED | : | December 29, 1998 |
| INVENTOR(S) | : | Edwin G. Sawdon et al |

It is certified that error appears in the above-identified patent and that said Letters Patent is hereby corrected as shown below:

On the Title Page, under Foreign Patent Documents, "3613582C1" should be -- 3613852C1 --.

Column 11, line 44, "alone" should be -- along --.

Signed and Sealed this

Thirty-first Day of August, 1999

*Attest:*

Q. TODD DICKINSON

*Attesting Officer*     Acting Commissioner of Patents and Trademarks